(12) United States Patent
McCoy

(10) Patent No.: US 11,489,325 B2
(45) Date of Patent: Nov. 1, 2022

(54) FLAT ARMS FOR REDUCED STRESS AND INCREASED LOAD CAPACITY

(71) Applicant: Underground Devices, Inc., Northbrook, IL (US)

(72) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 0 days.

(21) Appl. No.: 17/581,868

(22) Filed: Jan. 22, 2022

(65) Prior Publication Data

US 2022/0263303 A1     Aug. 18, 2022

Related U.S. Application Data

(60) Provisional application No. 63/149,709, filed on Feb. 16, 2021.

(51) Int. Cl.
*H02G 3/30* (2006.01)

(52) U.S. Cl.
CPC ..................... *H02G 3/30* (2013.01)

(58) Field of Classification Search
CPC ........... H02G 3/30; H02G 3/22; H02G 3/263; H02G 3/32; H02G 3/36; H02G 3/385; H02G 3/386; H01B 17/14; H01B 17/56; F16L 3/223; F16L 3/2235; F16L 3/23; F16L 3/22; F16L 3/221; F16M 13/02
USPC .......... 174/480, 481, 68.1, 68.3, 72 R, 72 A, 174/74 R, 88 R, 70 C, 135; 248/68.1, 49, 248/74.3, 74.5, 74.4, 60, 63, 73, 74.1, 65; 211/60.1, 70.4, 186, 189
See application file for complete search history.

(56) References Cited

U.S. PATENT DOCUMENTS

| 3,283,464 A | 11/1966 | Litzka |
| 3,787,016 A * | 1/1974 | Laval, Jr. ................. F16L 3/23 248/68.1 |
| 3,923,277 A | 12/1975 | Perrault |
| 4,003,168 A | 1/1977 | Brady |

(Continued)

OTHER PUBLICATIONS

Office Action dated Mar. 30, 2022, U.S. Appl. No. 17/581,867, filed Jan. 22, 2022 (16 pages).

(Continued)

*Primary Examiner* — Angel R Estrada

(57) ABSTRACT

Methods and devices for reducing stress and for increasing the load-bearing capacity of cable racks supporting electrical power and communication conduits and cables having increased versatility for conduit and cable sizes and quantities. Underground devices including rack arms for these applications are desirably made from plastic or composite materials. Rack arms desirably include openings for tying down the conduits and cables atop the arms. While non-metallic materials are designed to withstand environmental stresses, they typically have strength and rigidity properties less than the metallic structures previously used in such applications. Non-metallic rack arms with such openings may be reinforced locally with a stress attenuator or with ribs to increase their load-bearing and buckling capacity and to reduce their stress, strain and deflection under load. A stress attenuator may be made by increasing the in-molded thickness of the web in areas adjacent to or surrounding the tie-down openings.

20 Claims, 27 Drawing Sheets

(56) References Cited

U.S. PATENT DOCUMENTS

| | | | | |
|---|---|---|---|---|
| 4,013,253 A * | 3/1977 | Perrault | ............. | H02G 3/263 |
| | | | | 248/248 |
| 4,032,096 A * | 6/1977 | Perrault | ............. | F16L 3/243 |
| | | | | 248/220.21 |
| 4,960,253 A * | 10/1990 | Perrault | ............. | H02G 3/263 |
| | | | | 248/68.1 |
| 5,587,555 A * | 12/1996 | Rinderer | ............. | H02G 3/26 |
| | | | | 174/503 |
| 5,632,457 A * | 5/1997 | Neely, Jr. | ............. | H02G 3/26 |
| | | | | 248/69 |
| 6,012,256 A | 1/2000 | Aschheim | | |
| 6,135,332 A | 10/2000 | Eleam | | |
| 6,230,451 B1 | 5/2001 | Stoller | | |
| 6,401,939 B1 * | 6/2002 | Durin | ............. | H02G 3/0443 |
| | | | | 248/68.1 |
| 6,446,914 B1 * | 9/2002 | Laberis | ............. | H02G 3/30 |
| | | | | 248/49 |
| 7,090,174 B2 * | 8/2006 | Korczak | ............. | F16B 37/045 |
| | | | | 248/58 |
| 7,140,500 B2 | 11/2006 | McCoy | | |
| 8,093,499 B2 * | 1/2012 | Hoffer | ............. | H04Q 1/064 |
| | | | | 174/72 A |
| 8,517,186 B1 | 8/2013 | McCoy | | |
| 8,550,259 B1 | 10/2013 | McCoy | | |
| 8,567,734 B2 | 10/2013 | McCoy | | |
| 8,733,560 B2 | 5/2014 | McCoy | | |
| 8,960,612 B2 | 2/2015 | McCoy | | |
| 9,310,013 B2 * | 4/2016 | Komaro | ............. | H02G 3/266 |
| 9,758,963 B2 * | 9/2017 | Kawai | ............. | E04B 2/56 |
| 10,186,850 B1 * | 1/2019 | O'Regan | ............. | H02G 9/10 |
| 11,205,529 B1 * | 12/2021 | Rogerson | ............. | H01B 17/14 |
| 2006/0091088 A1 | 5/2006 | McCoy | | |
| 2011/0062292 A1 | 3/2011 | McCoy | | |
| 2011/0062293 A1 | 3/2011 | McCoy | | |
| 2014/0034790 A1 | 2/2014 | McCoy | | |
| 2016/0222650 A1 | 8/2016 | Kawai et al. | | |

OTHER PUBLICATIONS

Office Action dated Apr. 26, 2022, U.S. Appl. No. 17/581,870, filed Jan. 22, 2022 (38 pages).

Office Action dated May 25, 2022, U.S. Appl. No. 17/581,867, filed Jan. 22, 2022 (14 pages).

* cited by examiner

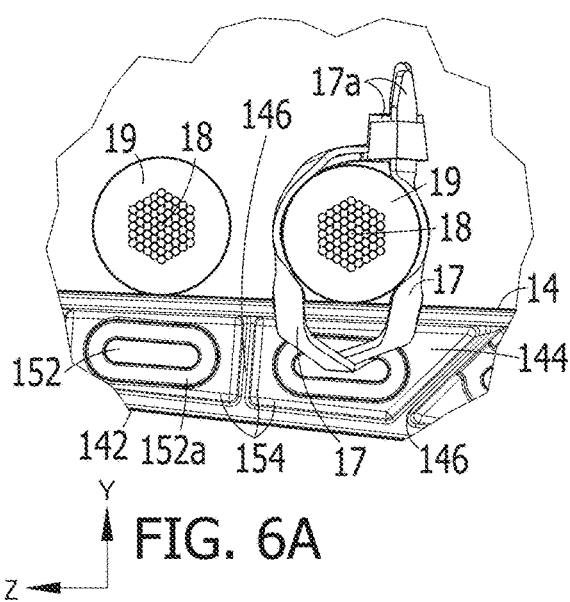
FIG. 6A
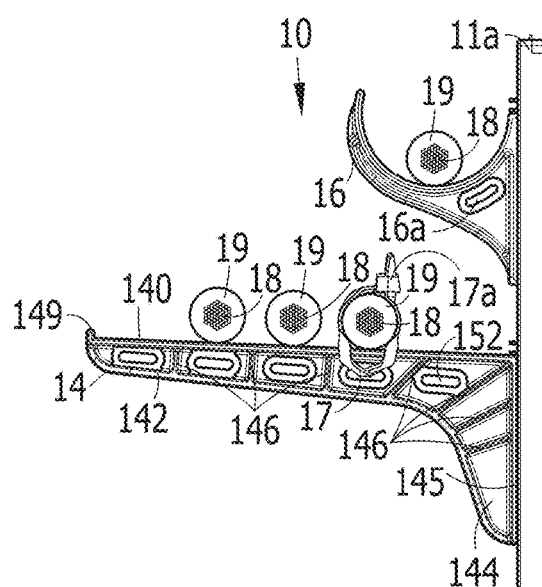
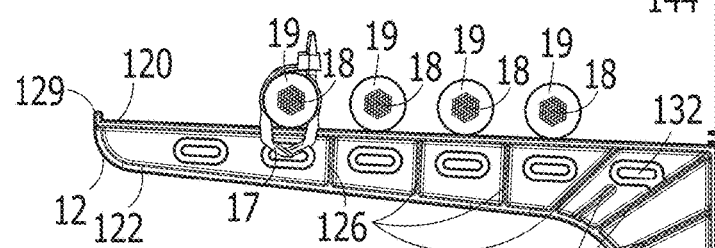
FIG. 6
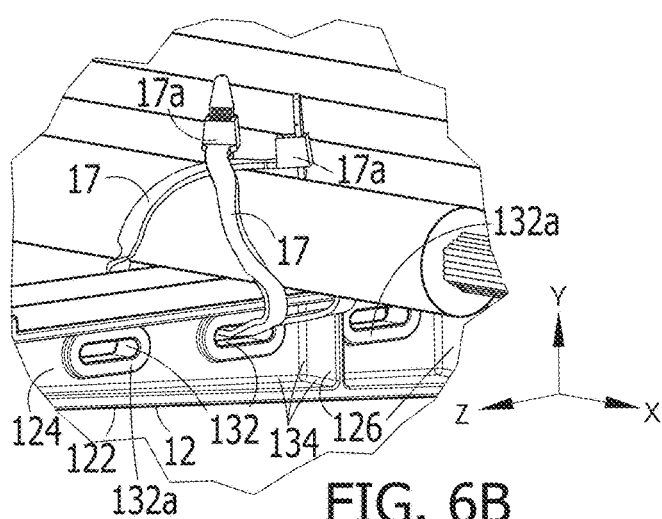
FIG. 6B

RA20-LP ARM (PRIOR ART)

RA20-LP ARM (PRIOR ART)

RA20-LP ARM WITH STRESS ATTENUATOR

RA20-LP ARM WITH STRESS ATTENUATOR

RA14-LP ARM (PRIOR ART)

RA14-LP ARM (PRIOR ART)

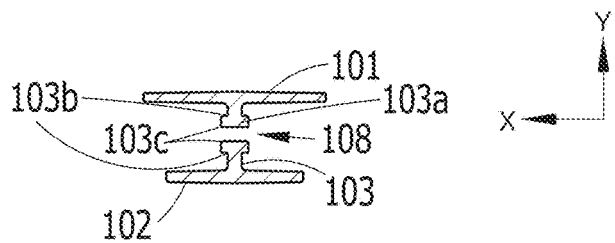
FIG. 10A
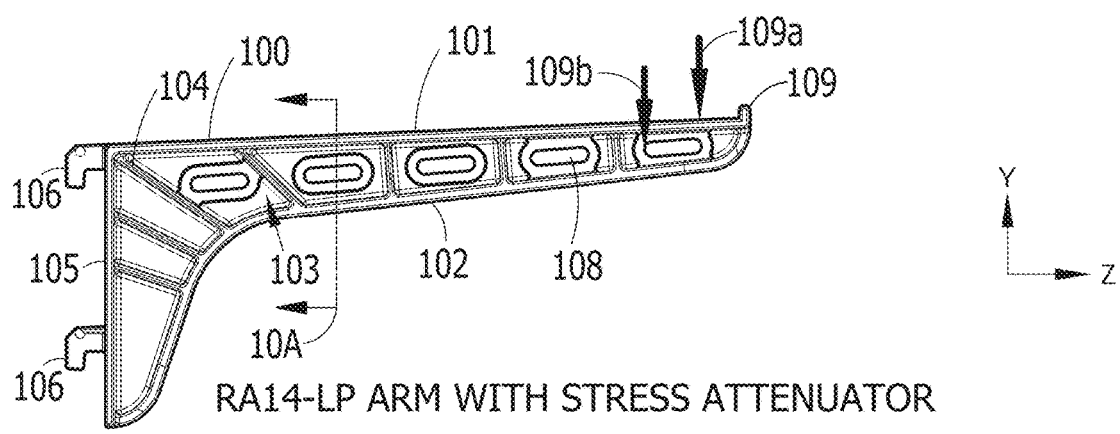
RA14-LP ARM WITH STRESS ATTENUATOR
FIG. 10
RA14-LP ARM WITH STRESS ATTENUATOR
FIG. 10B

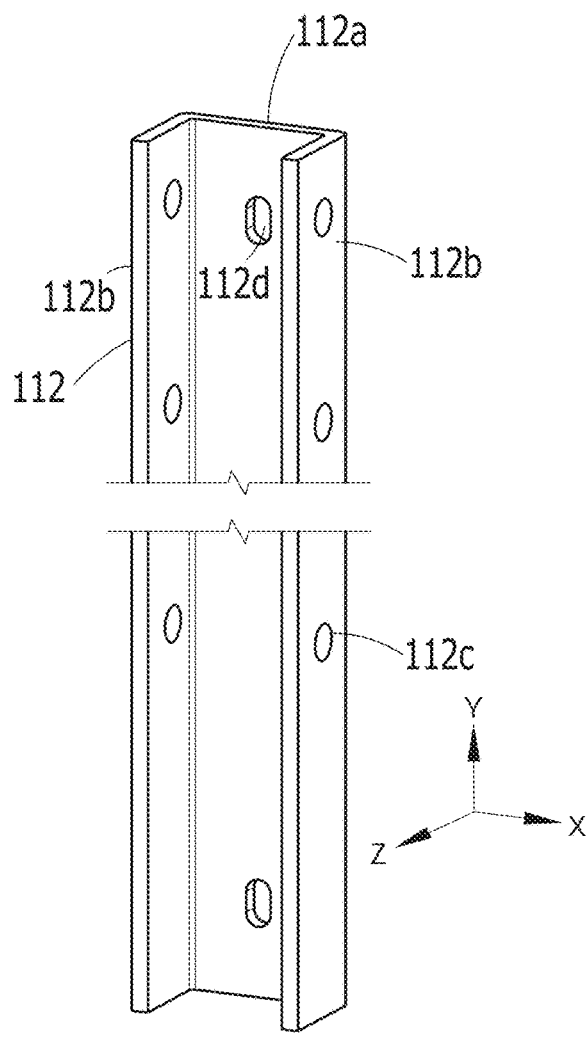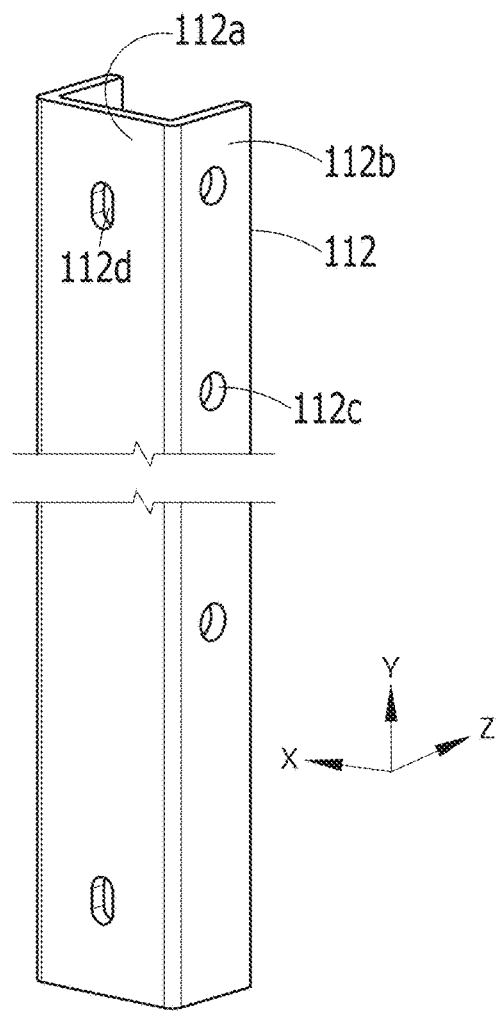
FIG. 14
FIG. 14A
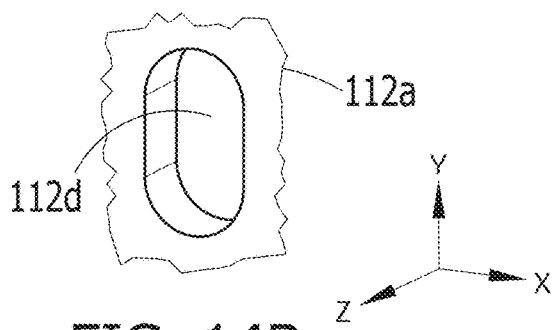
FIG. 14B

A4 ARM (PRIOR ART)

A4 ARM (PRIOR ART)

A4 ARM (PRIOR ART)

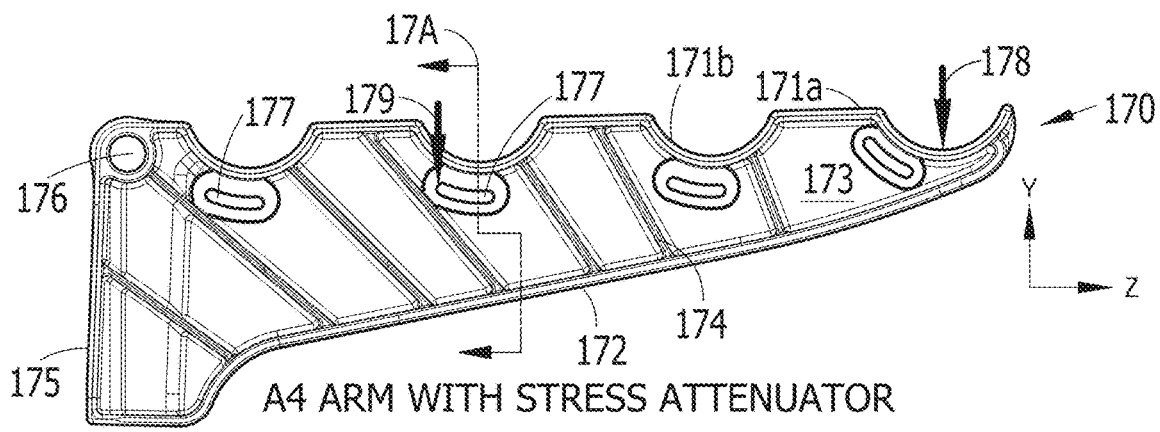
FIG. 17 A4 ARM WITH STRESS ATTENUATOR
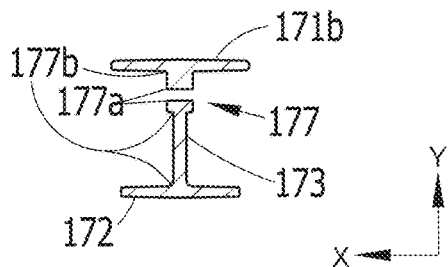
FIG. 17A
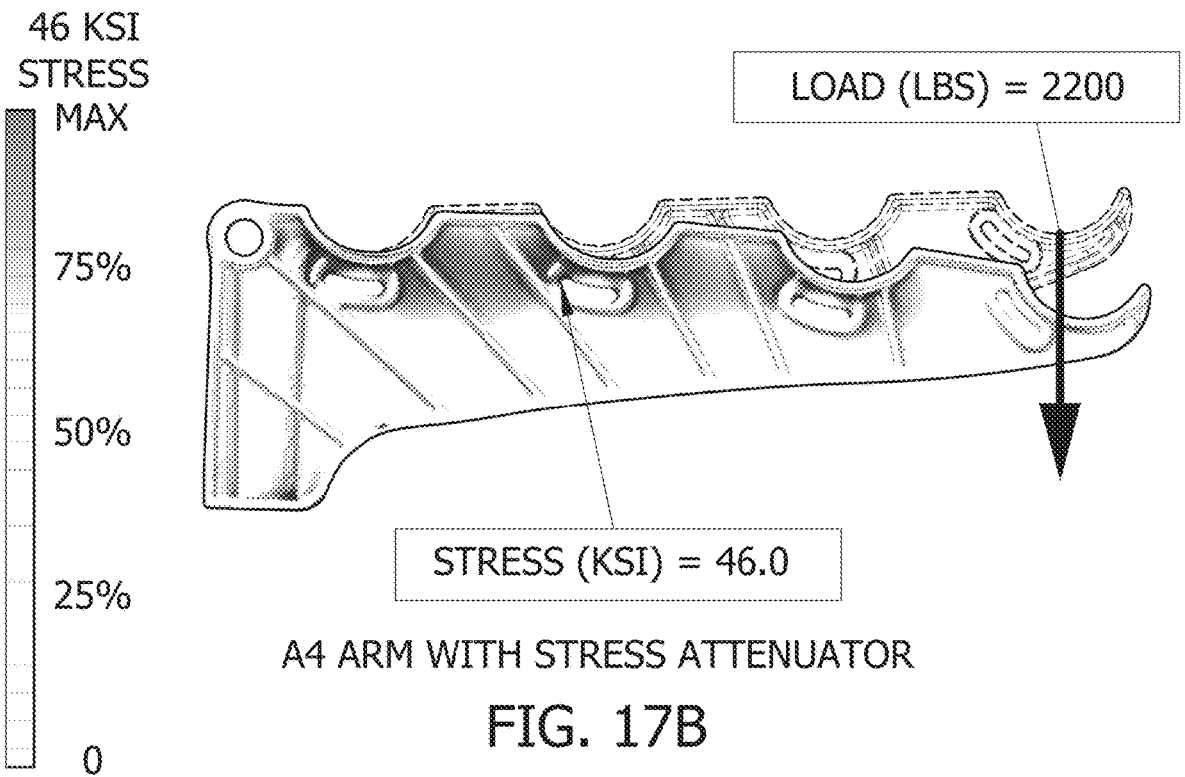
FIG. 17B A4 ARM WITH STRESS ATTENUATOR

A3 ARM (PRIOR ART)

A3 ARM (PRIOR ART)

A3 ARM (PRIOR ART)

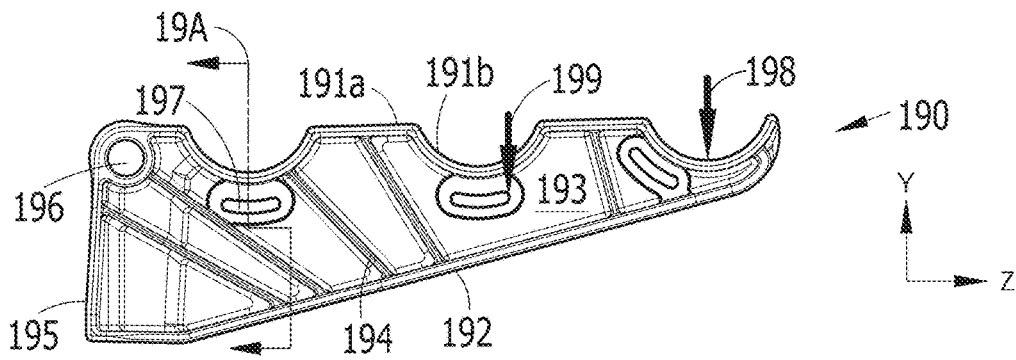
A3 ARM WITH STRESS ATTENUATOR
FIG. 19
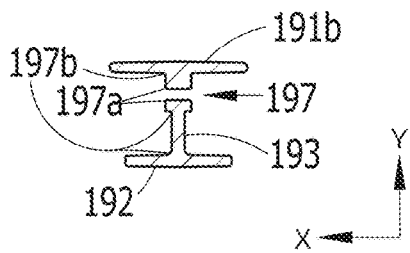
FIG. 19A
A3 ARM WITH STRESS ATTENUATOR
FIG. 19B

A2 ARM (PRIOR ART)

A2 ARM (PRIOR ART)

A2 ARM (PRIOR ART)

A2 ARM WITH STRESS ATTENUATOR

A2 ARM WITH STRESS ATTENUATOR

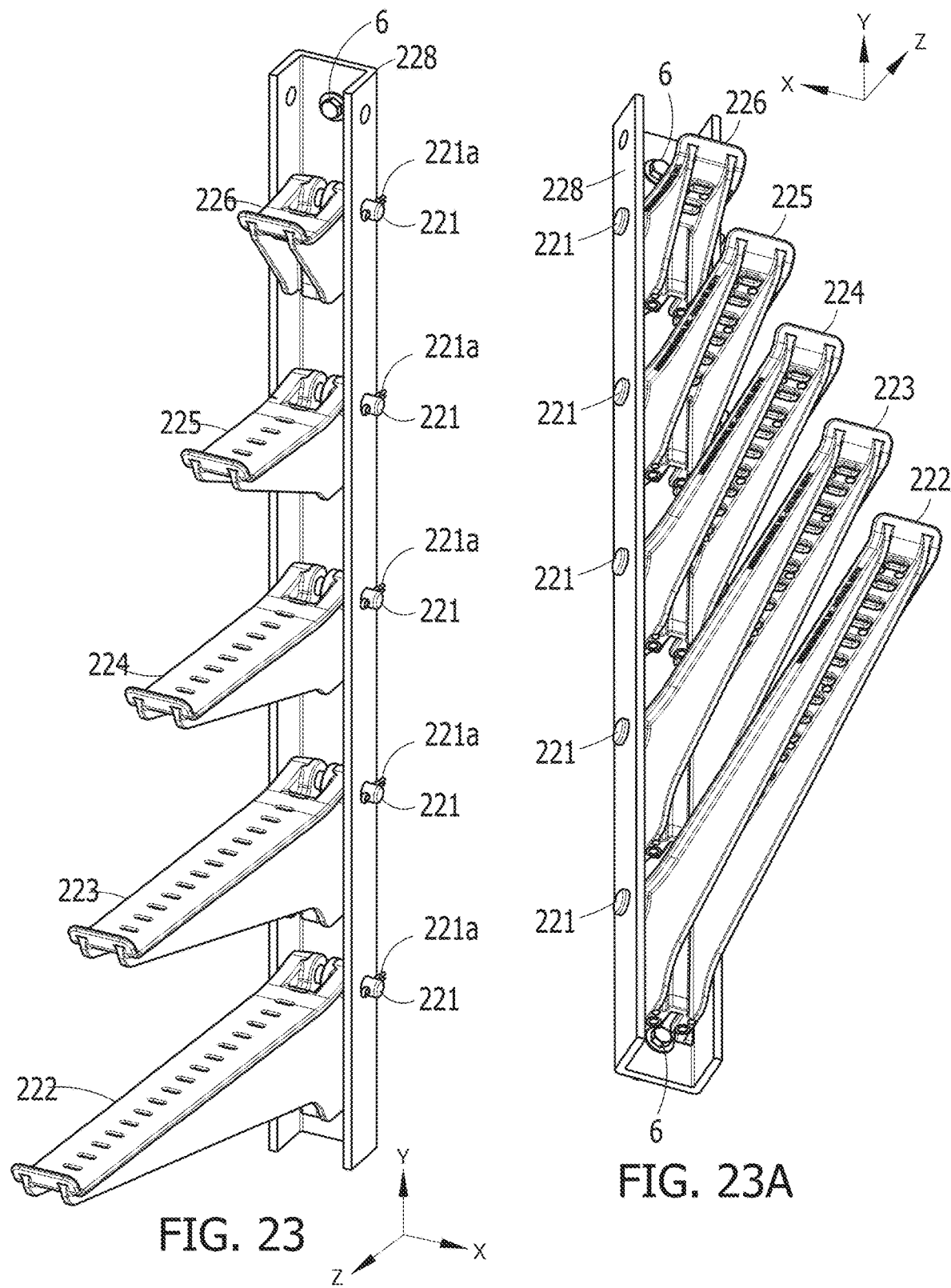

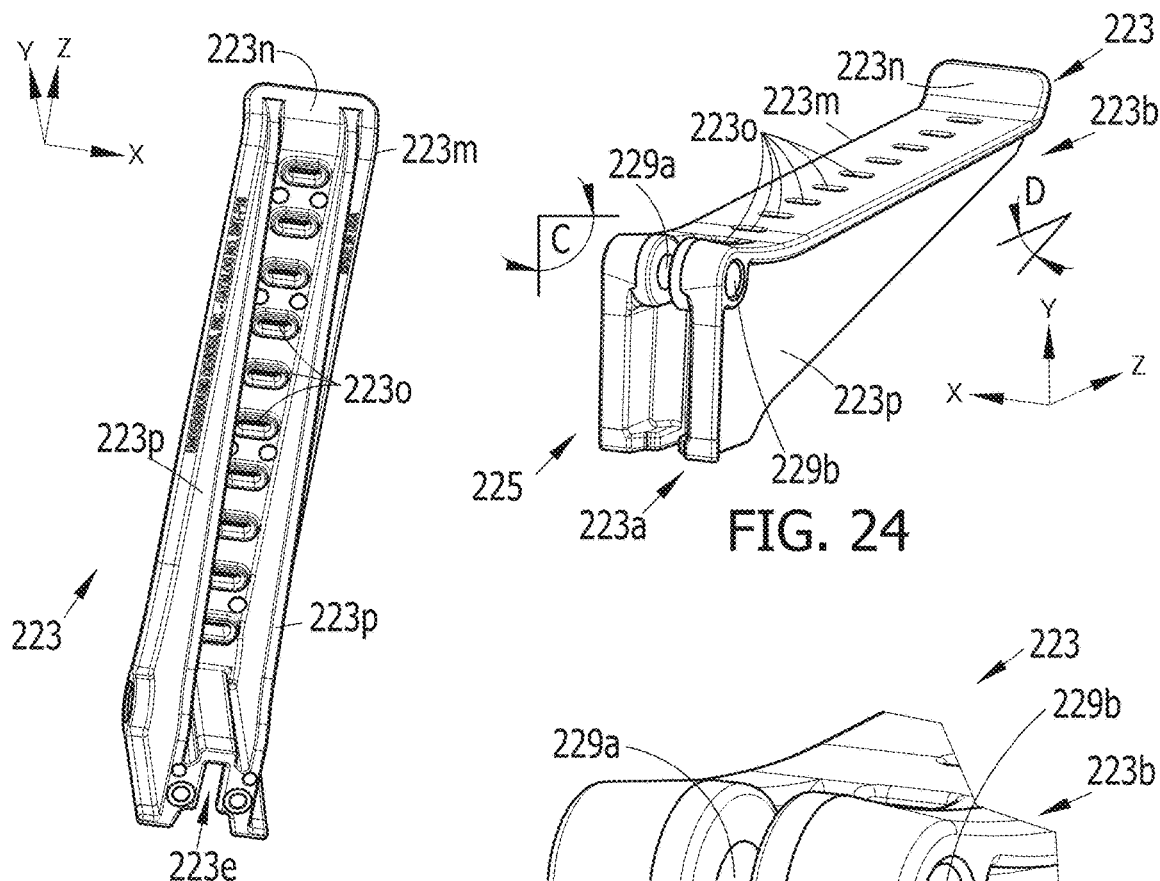
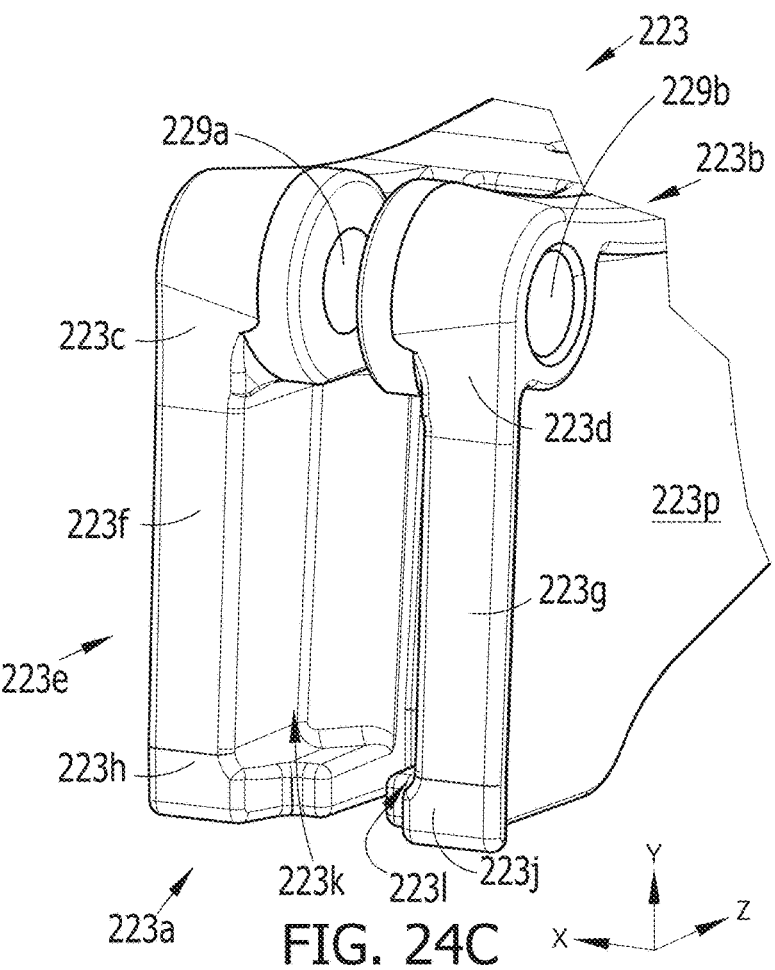
FIG. 24A
FIG. 24
FIG. 24B
FIG. 24C

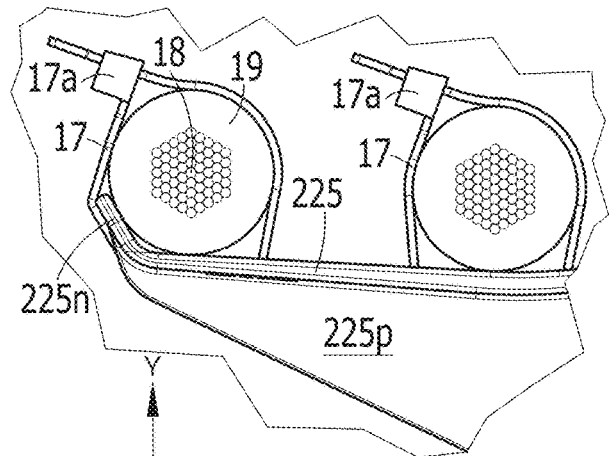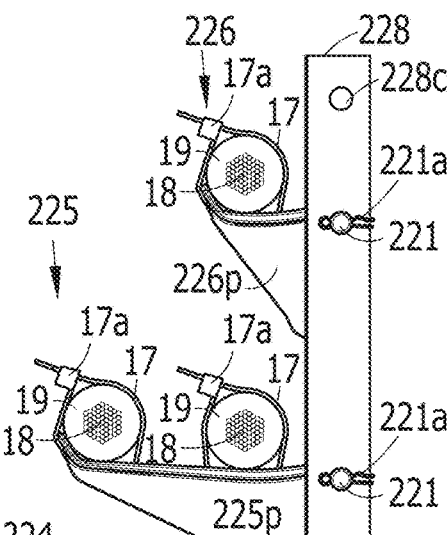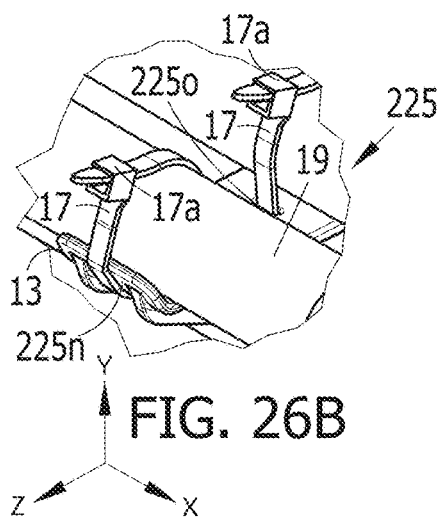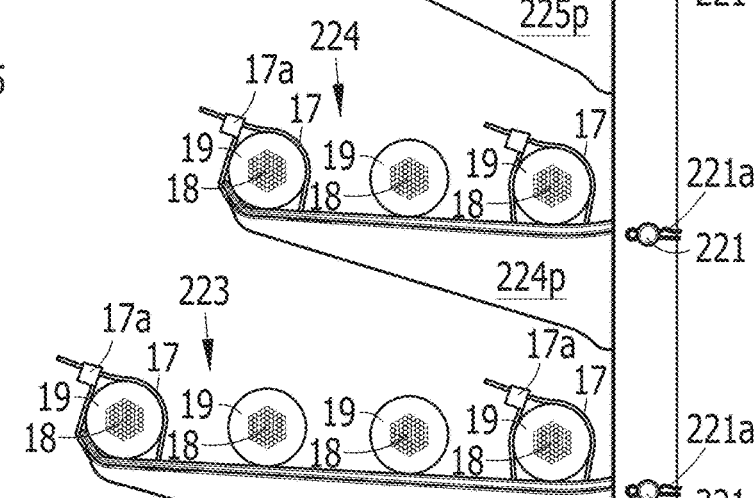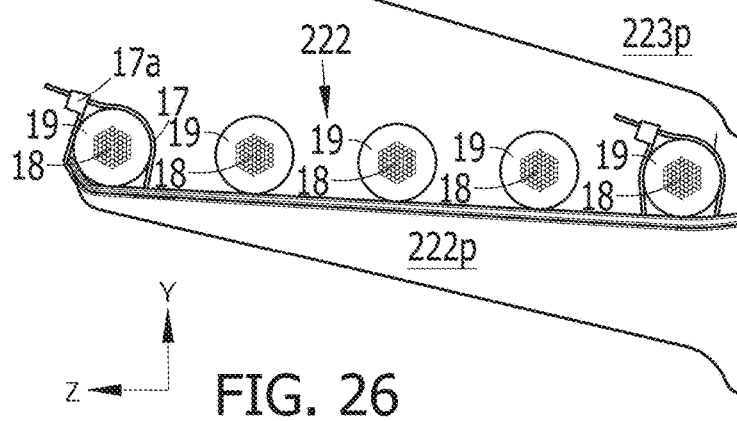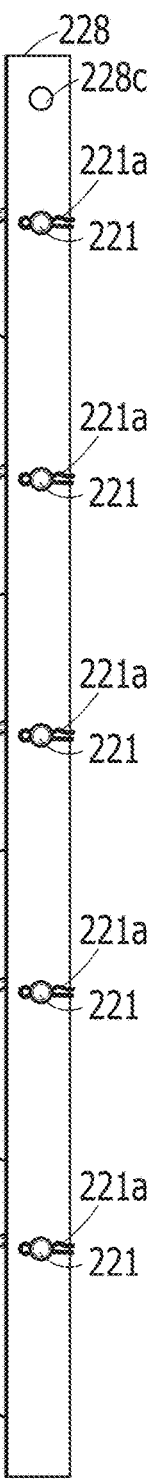

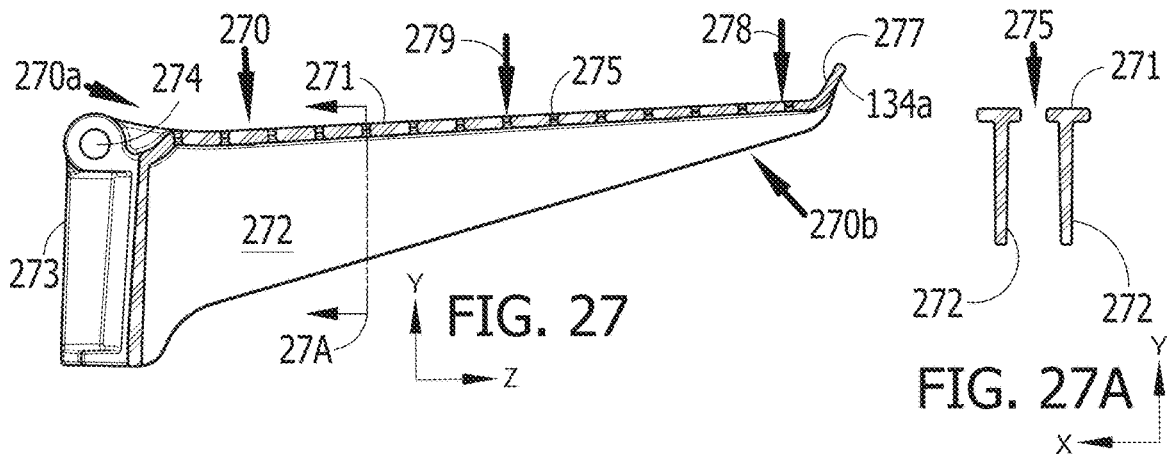
FIG. 27
FIG. 27A
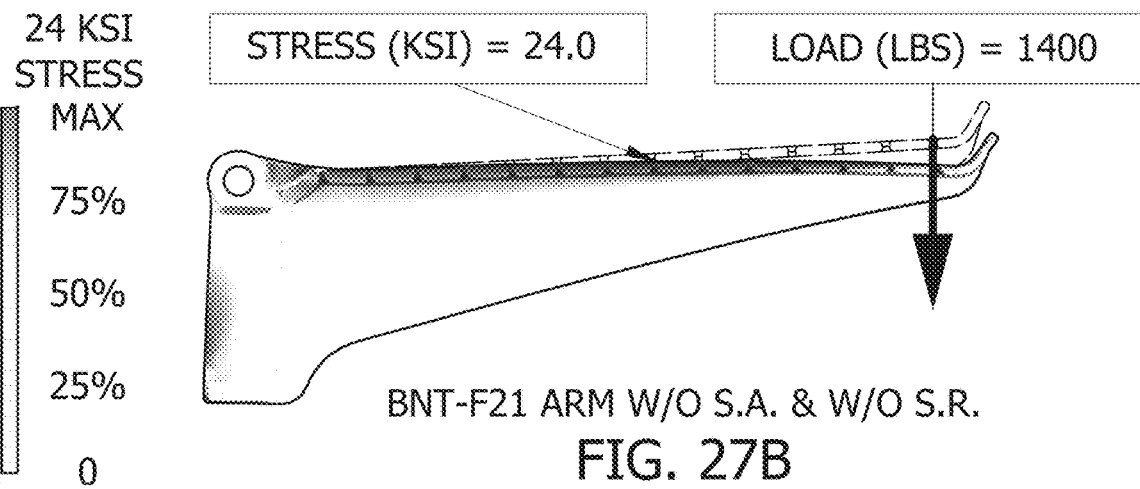
FIG. 27B
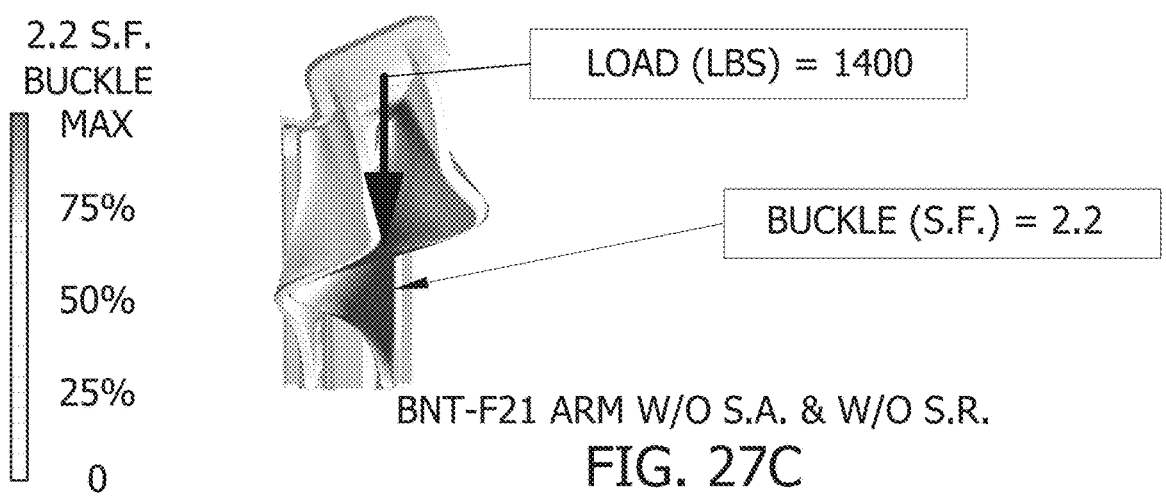
FIG. 27C

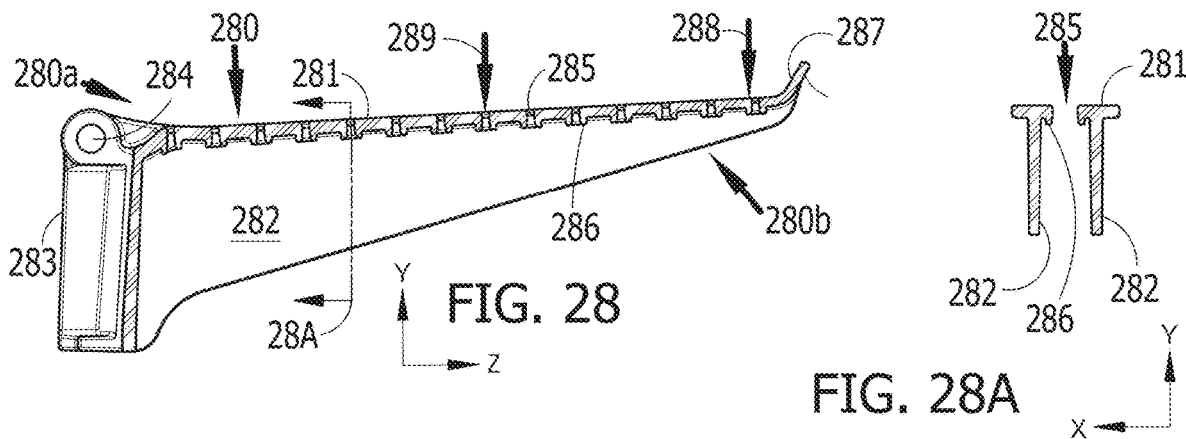
FIG. 28
FIG. 28A
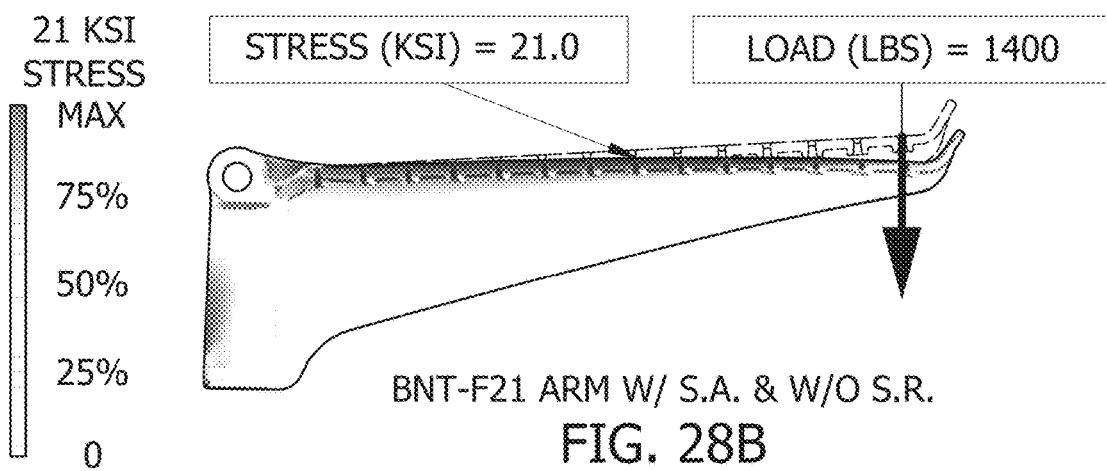
FIG. 28B
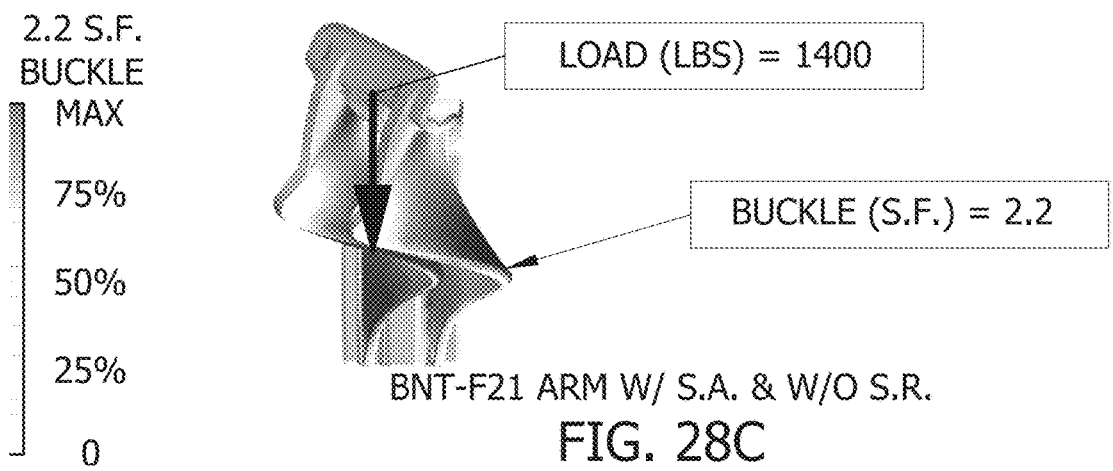
FIG. 28C

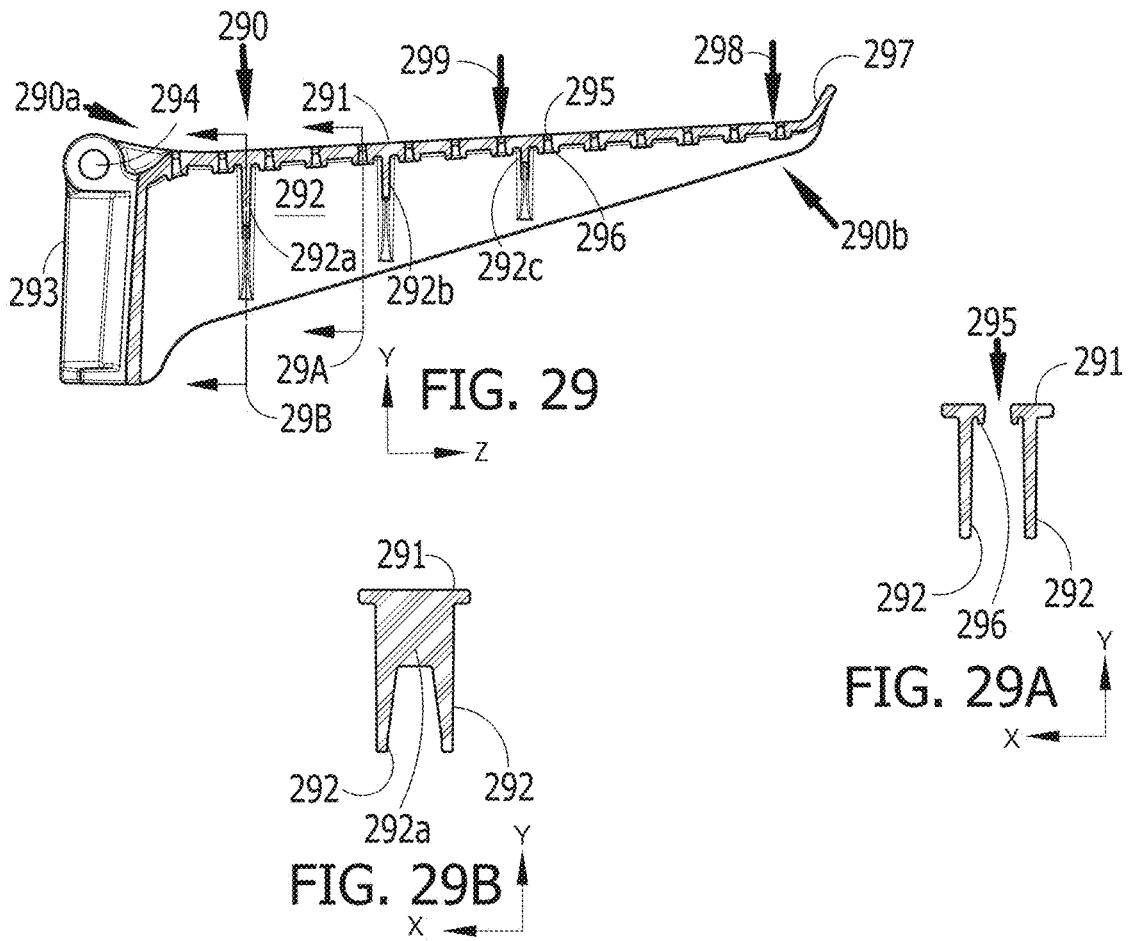
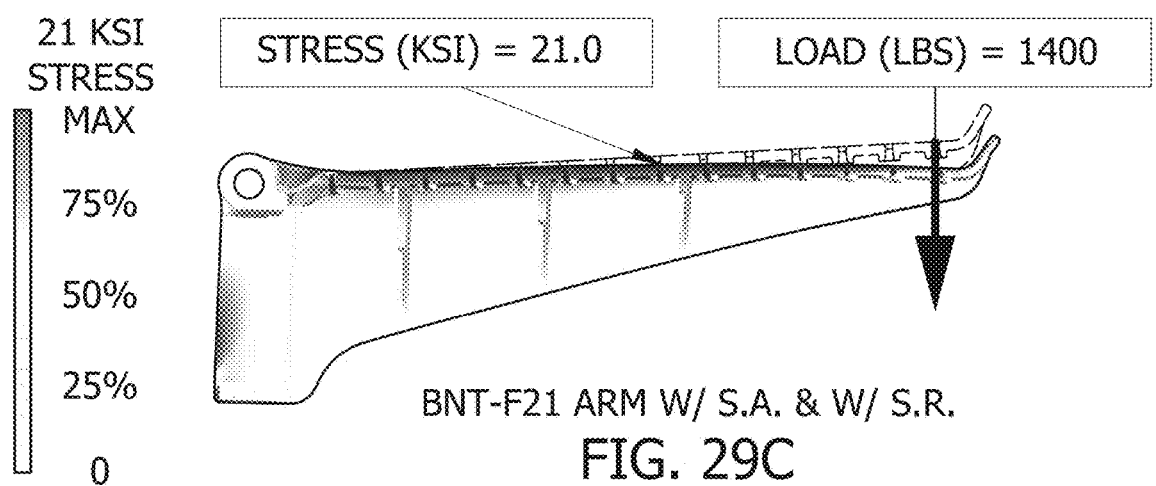

FLAT ARMS FOR REDUCED STRESS AND INCREASED LOAD CAPACITY

CLAIM TO PRIORITY

The present application claims the benefit of U.S. Provisional Appl. 63/149,709, filed Feb. 16, 2021, which is hereby incorporated by disclosure.

FIELD OF THE DISCLOSURE

The technical field of the disclosure is that of racks for supporting power and communication cables in underground manholes, vaults, and tunnels.

BACKGROUND

Cables for electric power and for communication lines are run underground in order to protect them from above-ground elements and from the interference and damage they would suffer when installed above the ground or on poles or structures. The underground environment may be less hostile in some ways, but the history of underground cables suggests that the underground environment is not to be considered benign.

Cables for electric power, control and communication lines are run underground in order to protect them from above-ground elements and from the interference and damage they would suffer when installed above the ground or on poles or structures. The underground environment may be less hostile in some ways, but the history of underground cables suggests that the underground environment is not benign. The environment in underground power and communications manholes is indeed harsh.

Cable racks or supports are used to organize and support medium voltage power distribution cables in underground manholes, vaults, and tunnels. Cable supports are also used to organize and support underground low voltage power cables and control cables, high voltage power transmission cables, and communication cables. Cable supports may also be used above ground and in areas other than underground manholes, vaults and tunnels.

While there may be fewer ultraviolet rays and less severe weather underground, and the temperature is more constant, moisture and humidity are always present. There are other considerations, such as the constant and higher danger from flooding, and underground pests that consider electrical insulation, and even steel, a tasty treat. Manholes may fill with water that is often contaminated with sewage, fertilizer runoff, tree roots, and chemicals, including caustic materials. Very harsh sea or salt water sometimes fills manholes. Many manholes are completely or partially filled with such contaminated water all of the time, except when pumped out for maintenance. Others fill periodically but are hot and have extremely high humidity, while still others fill and empty with ocean tides.

As noted, most power and communications manholes are partially or completely full of water some of the time or all of the time. The amount of water in a given manhole is influenced by location, surrounding conditions, drainage, and weather. Manholes located at higher grades generally will be filled with less water for a shorter period of time than those located at lower grades. Manholes located where the surrounding area has a high ground water level and/or a high amount of rain generally are filled with water to a higher level and more of the time than those located in areas that have a low surrounding ground water level and/or a low amount of rain. The water level in manholes located close to the ocean often changes with the tide, and the constantly-changing interface only increases the likelihood for corrosion. Water in underground power and communications manholes occasionally is fresh and clean but most often is contaminated, as noted above, or is salt water. Both of these can be very corrosive and also conductive.

Communication and power cables should be kept off surfaces such as floors or the ground and should be organized and protected to the greatest extent possible. Cables are thus typically supported underground by racks that elevate cabling and keep the cabling off the ground, thus shielding the cables from at least some of the worst underground dangers. Racks for supporting cables must be able to withstand both heat and cold, in all conceivable temperatures and humidities in every combination. In addition, the racks must be able to support very heavy loads from power and communication cables and have the versatility to vary the cables sizes and quantity. The racks themselves are preferably supported, e.g., attached to a wall, rather than free-standing structures. Thus, the racks will have penetrations, or stress concentrators, to deal with, in these hot, humid, and stressful environments, along with the high loads expected from supporting cabling. The walls themselves may have penetrations for supporting bolts, pins or other fasteners used to secure the racks in place. The walls, such as concrete walls or other structures, will also be in intimate contact with the racks, adding their chemical potential for corrosion to the racks.

All these stresses combine to make the underground a challenging environment for cable racks. For the most part, existing cable supports used in underground manholes, vaults, and tunnels are manufactured using steel stampings, steel forms, or steel weldments. They may also be ductile iron castings. After the supports are stamped, formed, welded, or cast, they are hot dip galvanized in an effort to prevent corrosive deterioration. The steel arms and posts are bonded together and grounded in an attempt to prevent corrosion. Eventually, the galvanized coating is consumed and the steel racks may oxidize or corrode away, leaving the power and communications cables without support.

Two phenomena, galvanic corrosion and stray current corrosion, occur in flooded underground manholes to cause this deterioration. Galvanized steel cable supports are very vulnerable to both galvanic and stray current corrosion and often become severely corroded to a point that they will no longer support the cables in a very short period of time.

Galvanic corrosion is an electrochemical process in which one metal, the anode, corrodes preferentially when in electrical contact with a different type of metal, the cathode, and both metals are immersed in an electrolyte. In flooded underground power and communications manholes the galvanized steel cable supports are the anodic sites of the galvanic corrosion reaction. Cathodic parts in the manhole, parts made from more noble metals such as stainless steel, may be damaged in the galvanic corrosion process due to generation of electrolytic hydrogen on their surfaces causing hydrogen embrittlement. Stray current corrosion of underground power and communication cable supports is usually caused by power and communications manholes being located in the vicinity of electric rail tracks, pipe lines that are cathodicly protected or the like.

Underground galvanized steel cable supports that are severely corroded and can no longer support the cables result in power and communications interruptions and a safety hazard to technicians who enter the manhole. Another safety issue is that galvanized steel cable supports are conductive. If a power cable's insulation is compromised and the electrified conductor contacts a galvanized steel cable support, the cable support is energized. If a technician inadvertently touches the energized cable support he may be electrocuted.

All these stresses combine to make the underground a challenging environment for cable racks. In the past and still today, many underground cable racks and fasteners are made from hot dipped galvanized steel. Underground cable racks, with cable rack arms and supporting stanchions, made from non-metallic plastic or composite materials, resistant to corrosion are now available. Spacers made from plastic or composite materials are also available. While products made from plastics or composites are much more resistant to the environment and the stresses discussed above, the materials from which they are made are not as strong and stiff as the steel or other metals currently used. What is needed are cable racks, cable rack arms, stanchions and spacers that are better able to withstand the stresses and strains of their environment and have the versatility to vary the cables sizes and quantity. These more versatile products should better withstand the loads imposed on them with lower stresses, less deflection and load, and for longer service.

BRIEF SUMMARY

One aspect of the disclosure is a non-metallic cable rack arm. The non-metallic cable rack arm, includes an upper portion formed between a proximal end and a distal end of the cable rack arm, a lower portion opposite the upper portion and a web having a nominal thickness connecting the upper portion to the lower portion, the web comprising at least one orifice for securing a load atop the non-metallic cable rack arm, wherein at least a portion of the web adjacent the at least one orifice comprises a thickness greater than the nominal thickness of the web. The increased thickness of the web acts as a stress attenuator for the cable rack arm.

Another aspect of the present disclosure is a non-metallic cable rack arm. The non-metallic cable rack arm includes an upper flanged portion formed between a proximal end and a distal end of the cable rack arm and also having a lower flanged portion opposite the upper portion. The rack arm also includes a web having a nominal thickness connecting the upper flanged portion to the lower flanged portion, the web comprising at least one orifice for securing a load to the non-metallic cable rack arm, at least a portion of the web adjacent the at least one orifice further comprising a thickness greater than the nominal thickness of the web, and an interface near the proximal end for securing the cable rack arm to a mounting stanchion. In one aspect, the portion of the web adjacent the at least one orifice may have a thickness at least twice the nominal thickness of the web.

Another aspect of the disclosure is a cable rack arm. The cable rack arm includes an upper portion formed between a proximal end and a distal end of the cable rack arm, the upper portion adapted for holding at least one cable and also includes a flanged lower portion opposite the upper portion, the flanged lower portion formed at an acute angle to the upper portion. The cable rack arms also includes a web having a nominal thickness connecting the upper portion to the lower portion, the web having at least one orifice for tying down the at least one cable and an interface near the proximal end, the interface comprising horizontal orifices and a vertical slot contiguous with the horizontal orifices, the vertical slot further also comprising side reliefs adjoining the proximal end of the cable rack arm, the interface suitable for mounting the cable rack arm on a flanged stanchion, wherein at least a portion of the web adjacent the at least one orifice further comprises a thickness greater than the nominal thickness of the web.

Another aspect of the disclosure is a non-metallic cable rack arm. The non-metallic cable rack arm includes a major cathetus upper portion formed between a proximal end and a distal end of the non-metallic cable rack arm, the upper portion adapted for holding at least one cable and a minor cathetus side portion formed at about a right angle to the major cathetus upper portion. The non-metallic cable rack arm also include a web having a nominal thickness connecting the major cathetus upper portion to the minor cathetus side portion, the web comprising at least one orifice for securing the at least one cable to the major cathetus upper portion, at least a portion of the web adjacent the at least one orifice further comprising a thickness greater than the nominal thickness of the web, and an interface near the proximal end. The thickness greater than the nominal thickness of the web is effective for at least one of: reducing stress on a point of the non-metallic cable rack arm by at least 15% for a given load; and increasing a bearing load capacity of the non-metallic cable rack arm by at least 25% for a given maximum stress of the non-metallic cable rack arm. In other embodiments, the thicker portions may be effective for reducing stress a minimum of 25% or increasing load-bearing capacity of the non-metallic cable rack arm a minimum of 35 percent for a given load.

In general, at least one of these, reducing stress or increasing load-bearing capacity by at least 15%, can be achieved by an increase in the thickness of the web. As seen and described in the examples herein, at least such a 25% increase can be achieved by making the web thicker, as described herein. This may be accomplished, as described herein, by making portions of the web, as described herein, at least fifteen percent thicker, twenty-five percent thicker, thirty-five percent thicker or fifty percent thicker. This is what is meant by a thickness greater than the nominal thickness of the web, to improve rack arm performance.

Another aspect of the present disclosure is a method for supporting power and communication cables. Steps of the method include furnishing a nonmetallic cable rack arm, the nonmetallic cable arm comprising an upper flange, a lower flange and a web of nominal thickness extending between the upper flange and the lower flange, wherein the web further comprising two orifices for securing the power and communications cables to the nonmetallic cable arm, and wherein at least a portion of the web adjacent the orifices further comprises a thickness greater than the nominal thickness of the web. The steps also include mounting the nonmetallic cable arm to a stanchion and placing at least one power or communication cable atop the cable rack arm. In one aspect of the disclosure, the cable rack arm is secured to the nonmetallic stanchion with at least one fastener, wherein the at least one fastener comprises a material selected from the group consisting of nonmetallic, nonmetallic composite and metallic materials.

Another aspect of the present disclosure is a non-metallic cable rack arm. The non-metallic cable rack arm includes a proximal end, a distal end, and also includes a top formed between the proximal end and the distal end of the cable rack arm, the top including at least one orifice for securing a load atop the non-metallic cable rack arm. The cable rack arm also includes left and right sidewalls connected to the top and to the proximal and distal ends of the cable rack arm. The top of the cable rack arm may be flat, except for the at least one orifice, or there may be two or more orifices in the top.

Another aspect of the present disclosure is a non-metallic cable rack arm. The non-metallic cable rack arm may include a top portion formed between a proximal end and a distal end of the cable rack arm, the top portion comprising a plurality of orifices. The non-metallic cable rack arm may also include a back portion adapted for mounting to a stanchion, left and right sidewalls connecting the top portion to the back portion, and a reinforcement under at least one of the plurality of orifices.

There are many other aspects of the disclosure, of which only a few are described below.

BRIEF DESCRIPTION OF THE DRAWINGS

FIG. 6 depicts a side cross-sectional view of the installation of FIG. 1;

FIG. 6A depicts a close-up elevational view of the upper arm of FIG. 6;

FIG. 6B depicts a close-up perspective view of the lower arm of FIG. 6;

FIG. 10 depicts a side view of another cross arm according to the present disclosure;

FIG. 10A depicts a cross-sectional view of the web of FIG. 10;

FIG. 10B depicts stresses on the cross arm of FIG. 10 when a load is applied;

FIG. 14 depicts one of the stanchions of FIGS. 11-12;

FIG. 14A depicts a rear perspective view of the stanchion of FIG. 14;

FIG. 14B depicts a close-up of a mounting hole in the web of the stanchion of FIGS. 14-14A;

FIG. 17 depicts a side view of a rack arm according to the present disclosure;

FIG. 17A depicts a cross-sectional view of the web of FIG. 17;

FIG. 17B depicts stresses on the cross arm of FIG. 17 when a load is applied;

FIG. 19 depicts a side view of another rack arm according to the present disclosure;

FIG. 19A depicts a cross-sectional view of the web of FIG. 19;

FIG. 19B depicts stresses on the cross arm of FIG. 19 when a load is applied;

FIG. 23 is a less-encumbered view of FIG. 22, showing details of the flat arms;

FIG. 23A is an upward view of FIG. 23, revealing details of the stress attenuators of the flat rack arms of FIGS. 22 and 23;

FIGS. 24, 24A, 24B and 24C are more detailed views of the rack arms of FIGS. 22-23;

FIGS. 26, 26A and 26B show additional details of the rack arms in this embodiment;

FIGS. 27 and 27A depict a side view and a cross-sectional view of a cable rack arm without stress attenuators or ribs;

FIGS. 27B and 27C depict stresses and a failure mode of this cross arm;

FIGS. 28 and 28A depict a side view and a cross-sectional view of a rack arm with a stress attenuator; FIGS. 28B and 28C depict stresses and a failure mode of the rack arm with the stress attenuator; and FIGS. 29, 29A and 29B depict side and cross-sectional views of a rack arm having a stress attenuator and reinforcing ribs; FIGS. 29C and 29D depict stresses and a failure mode of the rack arm of FIG. 29.

DETAILED DESCRIPTION OF THE DRAWINGS AND THE DISCLOSED EMBODIMENTS

Embodiments of the present disclosure are preferably molded from non-metallic or plastic materials. In this context, "plastic" materials include any resinous, thermoset, or thermoplastic materials, including materials that are reinforced, foamed, or otherwise altered, and which are formed by molding. Thus, in one embodiment, nylon with short glass fibers is used to make strong, stiff, and environmentally-resistant stanchions and rack arms. Other embodiments may use less costly materials, such as polyethylene or polypropylene, for applications in which less strength is required. The plastic materials may also include particulate fillers, such as aluminum oxide or calcium carbonate, or any other filler useful in plastics molding. Other additives, such as flame or fire retardant substances, may also be useful.

Underground cable racks face several constraints for successful service. One of these constraints is that the molded stanchions or posts generally include penetrations so that the stanchions or posts may be attached to the walls or surfaces of the manholes or other underground installations in which they are placed. If cable rack arms are not integral with the stanchions, there are then more penetrations so that the rack arms may be installed, to hold cables for power or communications. Each such penetration may be considered as a stress concentrator, a point in the structure at which stresses will be more likely to cause failure.

In molded posts or stanchions, the effects of the stress concentrators may at least be minimized by molding in the penetrations or holes, such as attaching and holding apertures. In this way, the well-known "skin-effect" of plastic non-metallic materials will apply, lessening the effect of the stress concentration. The skin-effect of as-molded plastics means simply that there is a barrier layer of resin on the surface, resistant to infiltration of water. Embodiments of the present disclosure mold in a number of important features to take advantage of the skin effect and to make the stanchions as useful as possible. If fasteners are used in assembling or installing composite or plastic underground cable racks, the fasteners may also be made of composite or plastic components, as will be seen below.

Figure 1:
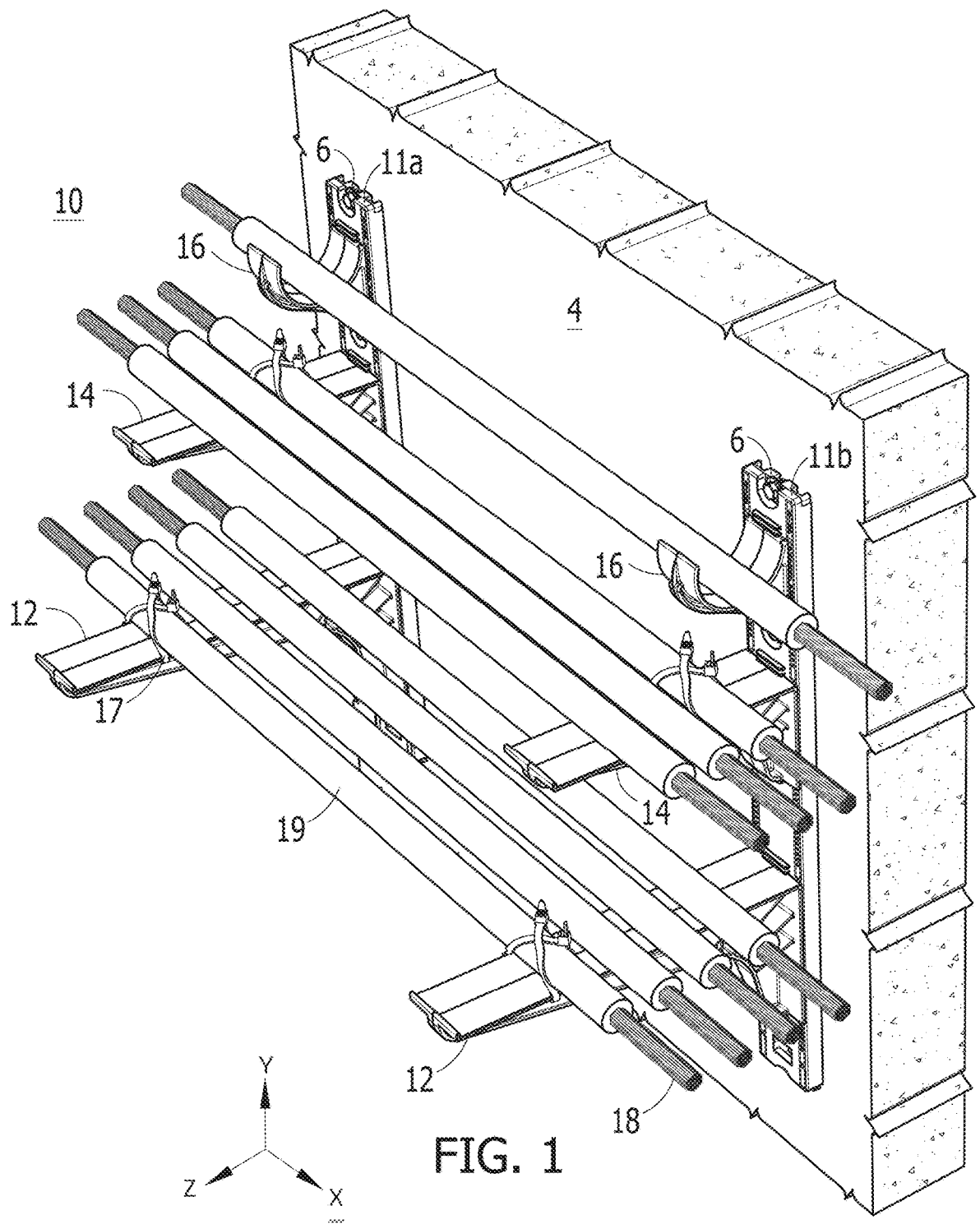
FIG. 1 is a perspective view of stanchions with rack arms in an underground installation with embodiments of the present disclosure.

A first embodiment of the disclosure is depicted in FIG. 1, which depicts an underground cable installation 10 with two molded stanchions 11a, 11b. Stanchions 11a, 11b are installed in tandem as adjacent vertical columns. Stanchions 11a, 11b are desirably mounted adjacent each other when there are a large number of cables to provide adjacent mutual support for each other.

Figure 2:
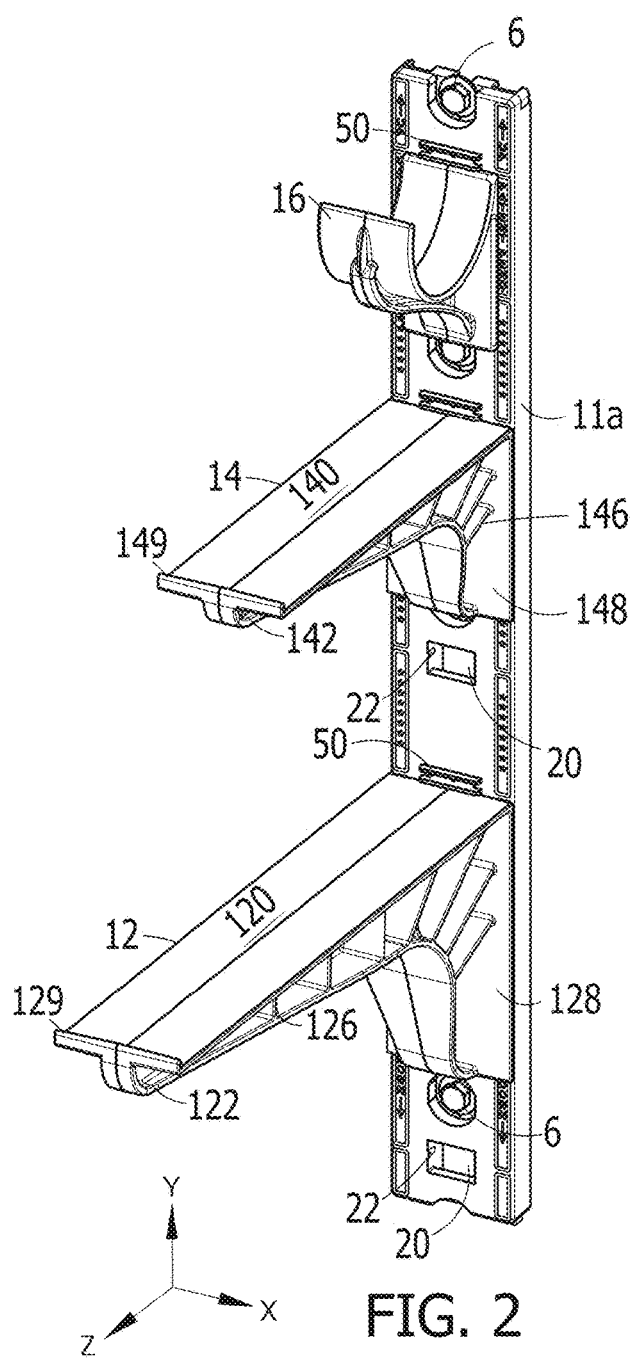
FIG. 2 is a closer perspective view of one of the stanchions of FIG. 1, showing rack arms of the installation.

Each column includes a stanchion 11a, 11b, and three supports 12, 14, 16 for holding power and communication cables 18. Installation of cables may include insulation 19 or a conduit that encases the cables 18. Cable supports 12, 14 may termed cable rack arms, while shorter support 16 may be a U-shaped arm. Each rack arm 12, 14 may support a plurality of power or communications cables, as shown. The cables may be secured to the arms with cable ties 17. Communications cables and power cables, secured to the stanchions by cross arms or by cable ties, are preferably separated from each other. Stanchions 11a, 11b may include holding apertures 20 for installing cross arms, and attaching apertures 24, see FIG. 4, for bolting the stanchions to a wall or other structure in the underground installation. While the stanchions and cross-arms are most useful for underground use, there is no reason why they cannot be used in other applications, such as for aboveground or even mobile power or utility installations. As depicted in FIG. 2, there are preferably two holding apertures 20 straddling each attaching aperture 24, except at the top of the stanchion, where there is a single attaching aperture 24 for a single holding aperture 20. In FIG. 1, stanchions 11a, 11b are bolted to a concrete wall 4 with bolts 6 at the top and bottom of the stanchion (bottom bolts not visible in FIG. 1). Additional bolts may also be used in the central portion of the stanchion.

A closer view of stanchion 11a and its cable rack support arms is shown in FIG. 2. Lower cross arm 12 is longer and able to support more power or communications cables. Stanchion holding apertures 20 may be rectangular with rounded corners, well known to those skilled in molding arts, the corners preferably radiused from about 0.005" to about 0.060" or more to avoid stress concentrations and cracking to the greatest extent possible. Holding apertures 20 preferably include a small projection 22 on one side of the aperture, for creating an interference fit when cross arms 12, 14, 16 are installed. Upper cross arm 14 may be shorter than lower cross arm 12.

Lower cross arm 12 includes a horizontal upper portion 120, a lower portion 122, a central portion 124 (see FIG. 6), and ribs 126 extending from the upper portion 120 to the lower portion 122. The lower cross arm 12 also includes a lip and a vertical mounting portion 128 for bearing against stanchion 11a. Vertical mounting portion 128 may be considered a proximal end of the cross arm, this portion being nearest the stanchion in which it is mounted. The opposite end of the arm 12, near lip 129, may be termed a distal end of cable rack arm 12. Upper cross arm 14 is also suitable for holding a plurality of power and communications cables. Upper cross arm 14 also include a horizontal upper portion 140, a lower portion 142, a central portion 144 (see FIG. 6), and ribs 146 extending from the upper horizontal portion 140 to the lower portion 142. Upper cross arm 14 also includes a lip 149 and a vertical mounting portion 148 for bearing against stanchion 11a. Vertical mounting portion 148 may be considered a proximal end of the cross arm, this portion being nearest the stanchion in which it is mounted. The opposite end of the arm 14, near lip 149, may be termed a distal end of cable rack arm 14. Additional details of the interplay and relationships between the central portion of the arms, the upper and lower surfaces, and the ribs will be depicted in later drawings.

Figure 3:
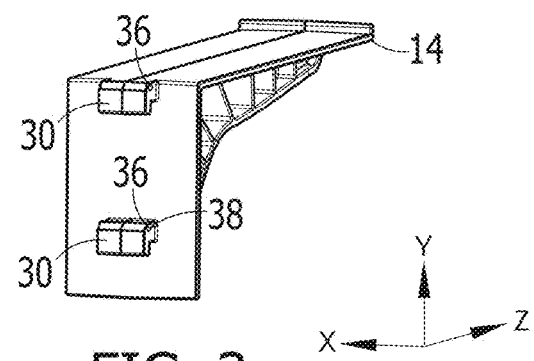
FIG. 3 is a rear perspective view of a rack arm.
Figure 3A:
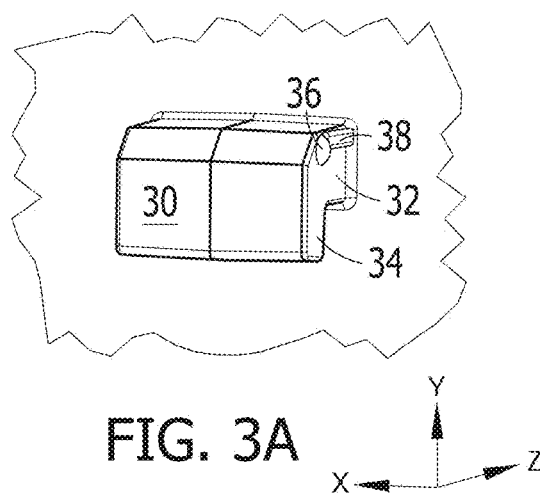
FIG. 3A is a partial view of a bracket from the rack arm of FIG. 3.

As shown in FIG. 3, upper cross arm 14 is shorter and may be suitable for bearing a smaller number of cables. The cross arms may be manufactured with brackets 30, as also shown in FIG. 3. In this embodiment, each cross arm is made with an upper bracket and an identical lower bracket, although the brackets may be different in other embodiments. As shown in FIG. 3A, each bracket 30 may include a support portion 32 and an attaching portion 34 for interfacing with the stanchion and mounting the cross arm to the stanchion. In the embodiment of FIGS. 3-3A, the brackets also include a projection or dot 36 for creating an interference fit with the holding aperture 20 and its projection 22. Projections may be a small, rounded dot 36 as shown on bracket 30 or may take on other forms. In FIG. 3A, bracket 30 has a projection that includes a dot 36 and a continuation rounded rectangle 38, which may be the same height as dot 36 or may be a lesser height. In one embodiment, the projections have a maximum height of 0.075 inches (2 mm); in other embodiments, the maximum height may be about 0.050 inches (1.2 mm). Other heights may be used.

The purpose of the projections is to create a slight interference fit and to reduce play when the cross arm is installed into a stanchion. The cross arm can bridge two stanchions. In this embodiment, cross arm 12 has two different projections, one of which is dot 36 and the other of which is dot 36 and continuation 38. The interference fit may occur only when the cross arm is being assembled, or the interference fit may be designed to continue after assembly. If interference continues after assembly, the joint may be known as a "friction fit." As may be seen in FIGS. 3 and 3A, there is preferably a longer projection 38 on at least one bracket of each cross arm to provide an interference fit for the assembly of the cross arm into the holding apertures. The heights of the projections on both the brackets and the apertures are chosen so that a person assembling the arm to the stanchion must exert effort to overcome the interference to complete the assembly. Once assembled, however, the interference will resist forces tending to cause disassembly, such as loads on cross arms and rocking of the stanchions in place.

Such friction fits tend to increase the stability of the joint and resist upward movement of the cross arm. This resistance is important, because many communications cables use splice cases to enclose sections where the cables are spliced together (not shown). Splice cases are typically rectangular or cylindrical in form, may be from seven to twelve inches (about 188 mm to 305 mm) in diameter, or more, and may be up to three feet or more in length. Splice cases are typically molded from plastic materials, or fabricated from stainless steel, or a combination of both. Splice cases are filled with pressurized air to resist ingress of water, and may thus be lighter than water. Splice cases are typically anchored to cross-arms, so that when a manhole fills with water, the buoyant splice cases can create an upward load on the cross-arms, tending to lift the cross arms from the stanchions or posts and helping to hold the arms in place. Friction fits reduce the likelihood that the cross arms will be lifted out of the stanchions, allowing the splice cases and cables to fall to the ground when the water eventually drains from the manhole.

Figure 4:
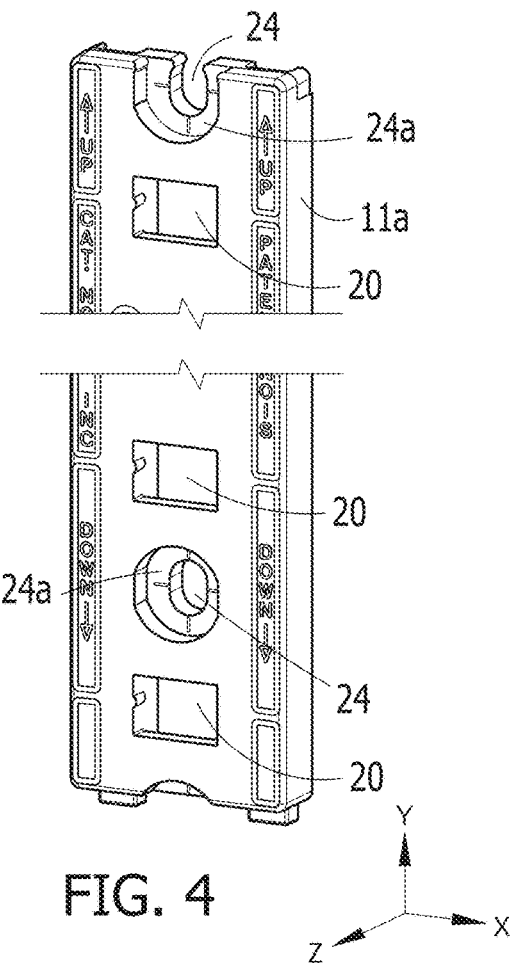
FIG. 4 is a front perspective view of a stanchion according to embodiments of the present disclosure.
Figure 4A:
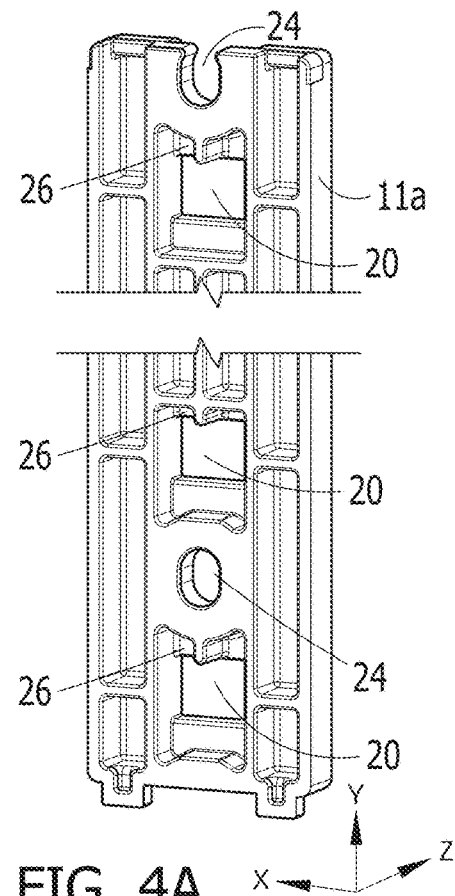
FIG. 4A is a rear perspective view of the stanchion of FIG. 4.
Figure 5:
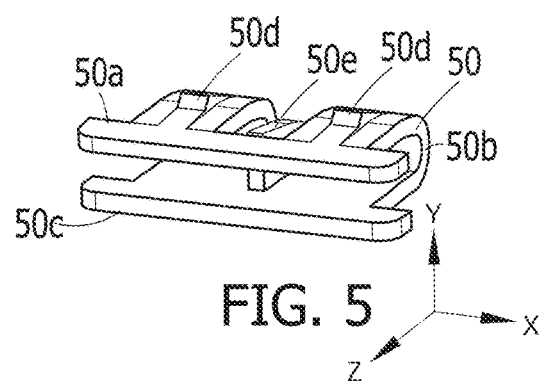
FIG. 5 is a perspective view of a locking barb useful in embodiments of the present disclosure.

FIG. 4 depicts the front portion of stanchion 11a and FIG. 4A depicts the reverse side of stanchion 11a, with front and reverse views of holding apertures 20, attaching apertures 24 and pockets 26 for receiving portions of a locking barb 50. As best seen in the lower or middle portion of FIG. 2, a locking barb 50, see FIG. 5, may be installed in the upper portion of the space remaining in aperture 20 after cross-arms 12, 14, 16 are mated with stanchion 11a. Stanchions 11a, 11b may also include recesses (not shown) for attaching cables 18, 19 by means of cable ties 17. The recesses and the wall to which the stanchion is attached create an aperture through which the cable tie is threaded. Locking barbs 50 may be considered to be fasteners because they aid in the assembly of these mechanical parts and help to hold the arms in place.

Figure 4B:
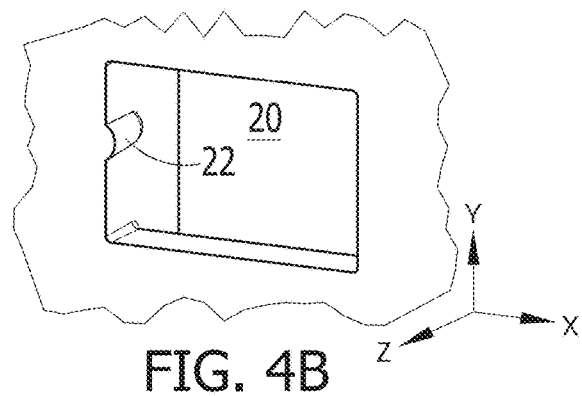
FIG. 4B is a close-up view of a holding aperture of the stanchion of FIG. 4.

As shown in FIG. 4, the attaching apertures 24 may be molded in circular or elliptical form, to easily distinguish attaching apertures 24 from holding apertures 20. In other embodiments, their shapes may be reversed, or may be the same, or may take on other shapes as desired. FIG. 4B depicts a close-up view of holding aperture 20 with projection 22, which reduces the space available in holding aperture 20 and may help in creating an interference fit. In one embodiment, projection 22 is a rounded or half-cylinder with a maximum height of about 0.075 inches (2 mm). Other shapes and other maxima may be used instead. The stanchion also includes circular or elliptical attaching apertures 24, used for attaching the stanchion to a nearby installation feature, such as a wall. Attaching apertures 24 may include recesses 24a for holding a washer or a bolt head used to fasten the stanchion to a wall. For all but the top-most attaching aperture on each stanchion, there are two holding apertures 20 for each attaching aperture 24.

When the locking barb 50 is bent and fully installed in aperture 20 between the upper surface of the upper arm bracket and the upper edge of the stanchion holding aperture, locking barb 50, which was compressed during the insertion procedure, opens, causing the upper surface of upper flange 50a to press against the upper edge of the holding aperture 20, the lower surface of lower flange 50c to press against the upper face of the upper arm bracket 36, and the barbs 50d to latch into pockets 26 provided on the rear of the stanchions, as shown in FIG. 4A. The latching of the barbs into the pockets secures locking barb 50 in the stanchion holding aperture, and also secures the rack arm to the stanchion.

Stanchions 11a, 11b may be molded in various sizes, such as different lengths or widths, and with other features deemed desirable for their use. Thus, stanchions 11a, 11b may be molded in standards sizes, such as 2 feet (24 inches long) or 3 feet (36 inches long), 3 inches or 4 inches wide, and 1" thick. Other lengths, widths, or depths may be used as desired, including metric sizes. In order to minimize the number of tools necessary to please a large number of customers, the stanchions may also be designed for custom tailoring. Thus, it is preferable that stanchion embodiments of the present disclosure may be field cut without losing all the benefits of a molded product, e.g., the skin effect of molded non-metallic or plastic materials, resisting infiltration of moisture.

The stanchions are designed so that the distance between adjacent holding apertures 20 is equal to or very close to the distance between brackets in the cross arms discussed above. This distance, from the bottom of one holding aperture to the bottom of the adjacent holding aperture, is known as the vertical adjustment. In instances where two stanchions are joined, the stanchions are designed so that the distance between the top holding aperture in the bottom stanchion and the bottom holding aperture in the top stanchion is also equal to or very close to the distance between brackets in the cross arms. This allows for ready installation of cross arms in a single stanchion, and also in joined or tandem stanchions. It has also been discovered that using the cross arm to bridge two stanchions in this manner adds to the stability of the assembled stanchions. Although a fastener or bolt and the male and female joining portions provide the primary support for joining the stanchions, the cross arm also serves to stabilize the two joined stanchions.

FIG. 2 also depicts the use of a locking barb 50 to positively lock arms 12, 14, 16 into apertures of stanchion 11a. The upper bracket of the cross arm and locking barb 50 described above fit into a holding aperture 20. Locking barb 50 is molded from relatively stiff plastic, such as polycarbonate, and may include stiffeners, such as glass fibers, so that locking barb 50 has a high spring constant and requires a considerable effort to bend flanges 50a, 50c about center 50b.

When the locking barb is bent and fully installed in aperture 20 between the upper surface of the upper arm bracket and the upper edge of the stanchion holding aperture, locking barb 50, which was compressed during the insertion procedure, opens, causing the upper surface of upper flange 50a to press against the upper edge of the holding aperture 20, the lower surface of lower flange 50c to press against the upper face of the upper arm bracket 36, and the barbs 50*d* to latch into pockets 26 provided on the rear of the stanchions, as shown in FIG. 4A. The latching of the barbs into the pockets secures locking barb 50 in the stanchion holding aperture.

Vertical block 50*e* is located in the center of the locking barb and is an integral part of the locking barb, providing the positive lock and preventing the arm from coming out of the stanchion under load. Locking barb 50 is removable and reusable. To remove the locking barb, the user presses down with some effort on upper flange 50*a*, causing barbs 50*d* to disengage from the pockets in the rear of the stanchion, and permitting locking barb 50 to be withdrawn from the stanchion holding aperture. The spring need not take on the shape depicted in FIGS. 2 and 5, but may take on any convenient shape for providing a compressive load to resist disassembly.

Closer views of the new disclosure are seen in FIGS. 6, 6A, 6B, 7, 7A, 7B, 8, 8A, 8B, 9, 9A, 9B, 10, 10A and 10B. FIG. 6 depicts a side view of the underground cable installation 10. Stanchion 11*a* is secured to a concrete wall 4 with bolts (not seen in FIG. 6). As previously shown in FIGS. 1 and 2, the installation includes lower cross arm 12, middle cross arm 14 and upper U-shaped arm 16. Lower cross-arm 12 includes an upper flanged portion 120, a lower flanged portion 122, a web 124 connecting the upper flanged surface to the lower flanged surface and lip 129, on a distal portion of arm 12. Vertical portion 125 on the proximal end of cross arm 12 is part of the interface of arm 12 with stanchion 11*a*. A series of reinforcing ribs 126 also extends from the upper surface to the lower surface. The web 124 is typically narrow in width, a nominal width, while the ribs typically, but not in all instances, extend from the upper surface or right side to the lower surface for the entire width of the upper and lower surface, respectively, as shown in FIG. 2. In FIG. 6, lower cross arm 12 supports four power or communications cables 18 with insulation 19. The cables may be secured to the cross arm with one or more cable ties 17 using the orifices 132 in the web of the cross arm.

Middle cross arm 14 also appears in FIG. 6, supporting three power or communication cables 18 with insulators or conduits 19. Cross arm 14 includes an upper flanged surface 140, a lower flanged surface 142, a web 144 connecting the upper flanged surface to the lower flanged surface and lip 149, on a distal portion of arm 14. Vertical portion 145 on the proximal end of the cross arm is part of the interface of the arm with stanchion 11*a*. A series of reinforcing ribs 146 also extends from the upper surface 140 or the right side to the lower surface 142. The web 144 may be narrow in width, a nominal width, while the ribs 146 typically extend fully from the upper surface to the lower surface for the entire width of the upper and lower surface, respectively, as also shown in FIG. 2. As shown for both cross arms 12, 14, cable ties 17 may be used to secure the cables to the cross arms. Middle cross arm 14 also has a series of orifices 152, which may be used with the cable ties to secure the cables to the rack arm. Upper U-shaped arm 16 also has an orifice 16*a* which may be used to tie down a power or communications cable 18 and its insulation 19.

A closer look at portions of cross arm 14 and cross arm 12 is seen in FIGS. 6A and 6B. In elevation view FIG. 6A, cross arm web 144 has apertures or openings 152 between ribs 146. The openings may be about a quarter-inch (6 mm) in width, or may BE wider or narrower. The openings may be about one inch (25 mm) long, or they may be longer or shorter than one inch. As seen in FIGS. 6, 6A and 6B, the openings or orifices may be parallel to a top surface of the cross arm. One or more cable ties 17 may be used to secure the cables and conduits or insulation to the cross arm 14. The cable ties may be plastic and may be secured using a fastener 17*a*, which may be an integral fastener. Outer portion 152*a* of aperture 152 is thicker than the web into which the aperture fits. Outer portion 152*a* is thicker than the nominal width of web 144. In one embodiment, web 144 is $5/16$ inches (8 mm) thick, and the outer portion of 152*a* is $19/32$ inches (15 mm) thick, about twice the thickness of web 144. FIG. 6B is a perspective view of lower cross-arm 12, this view showing better the thickness difference between web 124 with a nominal thickness and the outer reinforcement 132*a* of orifice or aperture 132. As discussed above in FIG. 6A, one or more apertures may be made between ribs 126 of the cross arm. The increased thickness of the reinforcement has been found to reduce the stresses on the arms 12, 14, 16 when they are subjected to stress.

It may be important to smooth all transitions between portions of the cross arms, such as cross arms 12, 14. Any changes in part shape or thickness should be generously radiused, so that there are no sharp corners or abrupt transitions. Corner radii of $1/16$ inches or $3/32$ inches may be used. Other corner radii may be used. In one example, the transition from the outer portion of the stress attenuator to the main body of the web are also radiused, e.g., $1/16$ inches or 0.0625 inches (1.6 mm). As seen in FIG. 6A for cross arm 14, there are dimensional transitions 154 between the lower flange 142 and web 144, between web 144 and ribs 146, and between web 144 and orifice 152 and its outer reinforced portion 152*a*. The same holds true for cross arm 12 in FIG. 6B. There should be generously radiused transitions 134 between web 124 and lower flanged portion 122, between web 124 and ribs 126 and between web 124 and orifices 132 and their outer reinforced portions 132*a*. In some embodiments, the outer portions 132*a*, 152*a* may only be slightly wider than their adjacent flanges, i.e., the thickness of the cross arm web 124, 144. In other embodiments, the outer portions may be twice as thick as the adjacent flange, i.e., the thicknesses of the web into which the orifices are placed.

Figure 7:
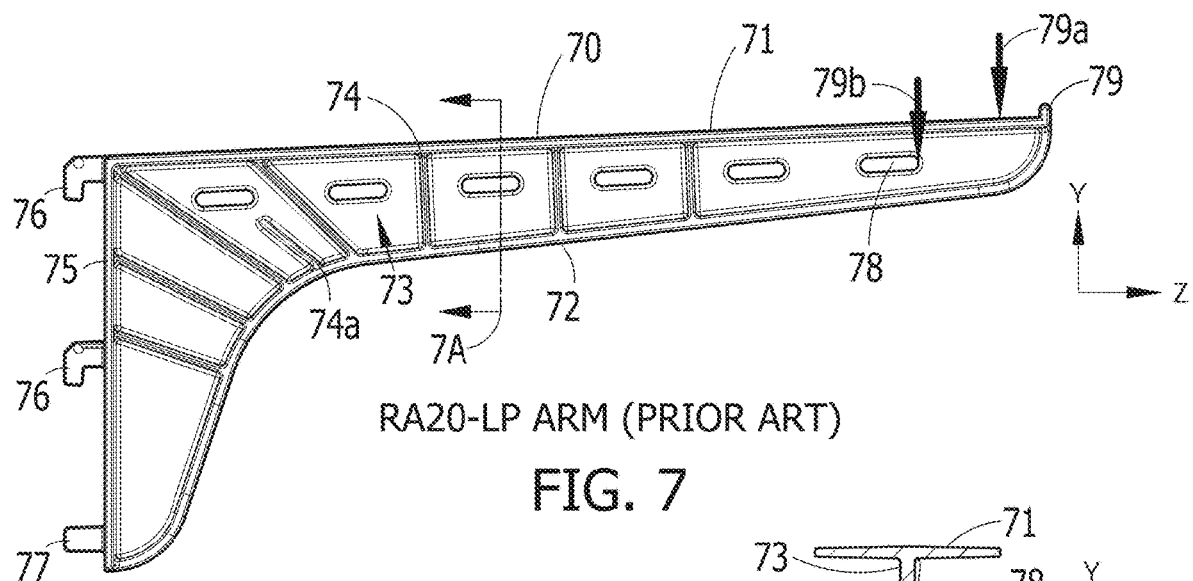
FIG. 7 depicts a side view of a prior art cross arm.
Figure 7A:
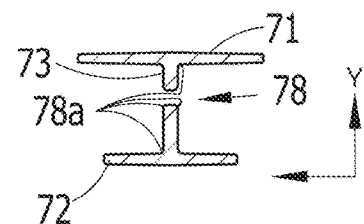
FIG. 7A depicts a cross-sectional view of the web of FIG. 7.
Figure 7B:
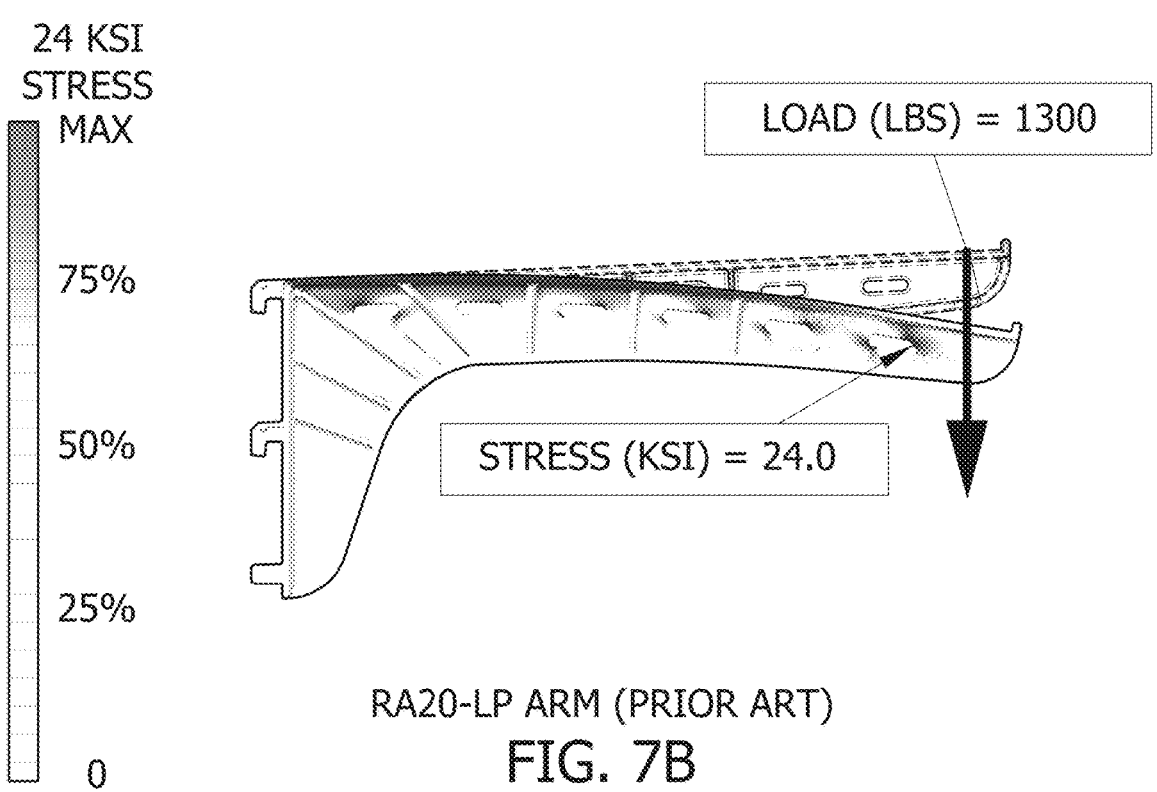
FIG. 7B depicts stresses on the prior art cross arm of FIG. 7 when a load is applied.

The situation may be better understood with reference to FIGS. 7, 7A and 7B. FIG. 7 depicts a standard RA-20 LP prior art cross arm 70 with a horizontal upper flange 71, lower flange 72, web 73, ribs 74, vertical side portion 75, angled interface brackets 76, 76*a*, and horizontal interface guide 77. Arm 70 also has a lip 79 on a distal end of the arm, while vertical side portion 75, angled brackets 76 and horizontal guide 77 are positioned on a proximal end of the arm, forming an interface area of the arm, for interfacing with a stanchion into which the arm will be assembled. Note that the top angled bracket 76 has a "dot" interference feature and the lower angled bracket 76*a* has the "dot" interference feature and a projection cylindrical interference feature. It is possible that one more ribs 74*a* do not extend all the way from lower flange 72 to horizontal upper flange 71. Cross arm 70 may include one or more apertures or orifices 78 that are suitable for use with cable ties (not shown). FIG. 7A is a cross-sectional view of FIG. 7. The orifice 78 is depicted in FIG. 7A as an opening in web 73, depicted here as having a uniform, nominal thickness. In testing, it was found that the prior art arm could withstand a maximum load of 1300 pounds 79*a* placed just inside lip 79 on the upper flange. Finite element analysis (FEA) showed that this resulted in a point of maximum stress of 24 ksi at a point 79*b* on the outer portion of the outer-most orifice 78. The load, stress and deflection are shown graphically in FIG. great.

Figure 8:
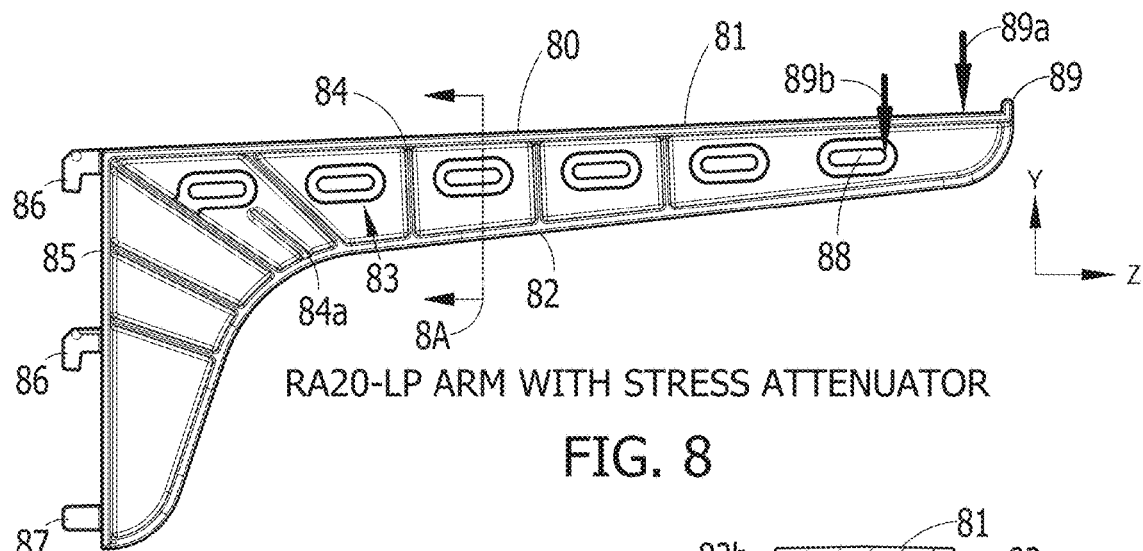
FIG. 8 depicts a side view of a cross arm according to the present disclosure.
Figure 8A:
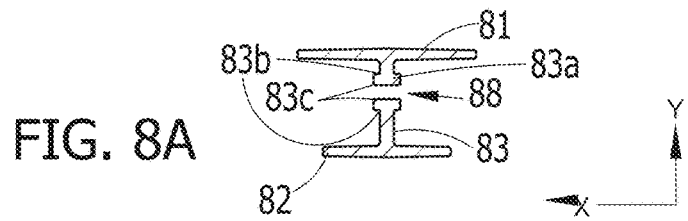
FIG. 8A depicts a cross-sectional view of the web of FIG. 8.
Figure 8B:
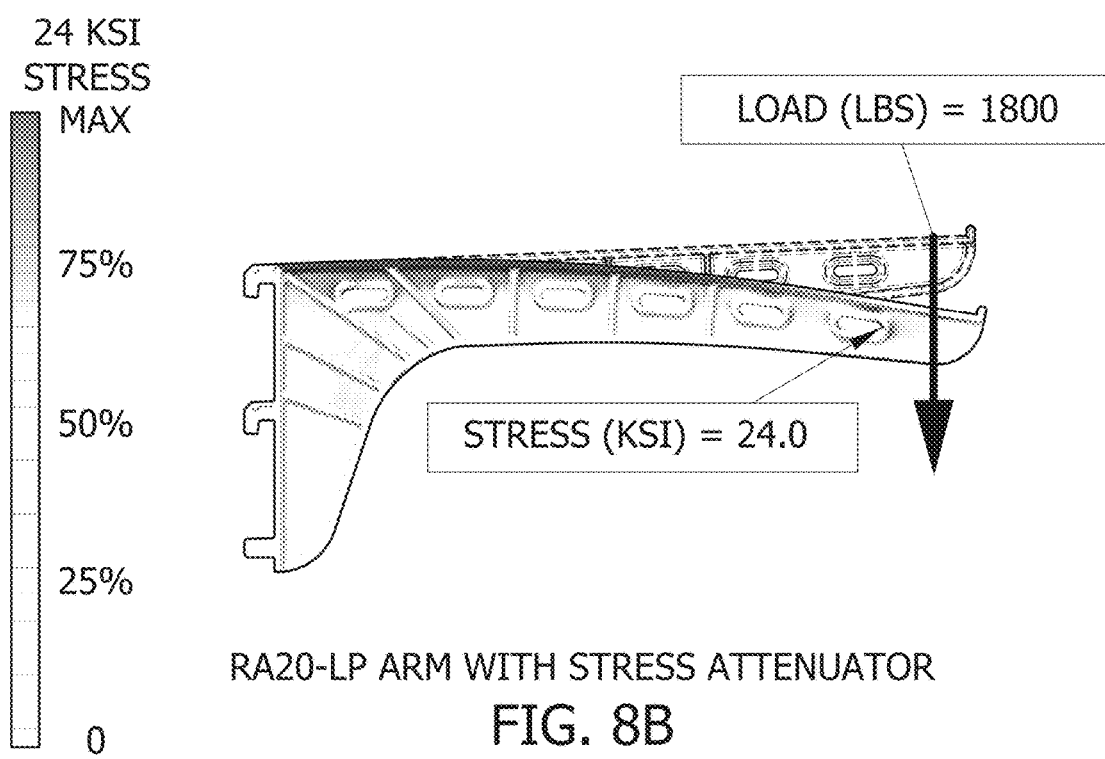
FIG. 8B depicts stresses on the cross arm of FIG. 8 when a load is applied.

The present disclosure may be better understood with reference to FIGS. 8, 8A and 8B. FIG. 8 depicts an improved RA-20 LP cross arm 80 according to the present disclosure in which the apertures or orifices have been reinforced by increasing the thickness of the web surrounding the apertures. Cross arm 80 includes a horizontal upper flange 81, lower flange 82, web 83, ribs 84, vertical side portion 85, angled brackets 86, 86a, horizontal guide 87 and tie-down apertures or orifices 88. Arm 80 also has a lip 89 on a distal end of the of the arm, while vertical side portion 85, angled brackets 86, 86a and guide 87 are positioned on a proximal end of the arm, for interfacing with a stanchion into which the arm will be assembled. Note that the top angled bracket 86 has a "dot" interference feature and the lower angled bracket 86a has the "dot" interference feature and a projection cylindrical interference feature. It is possible that one more ribs 84a do not extend all the way from lower flange 82 to horizontal upper flange 81. As noted previously, one or more of the apertures or orifices 88 are suitable for use with cable ties (not shown).

FIG. 8A is a cross-sectional view of FIG. 8, depicting upper flange 81, lower flange 82, web 83 and orifice 88. The nominal thickness of web 83 is increased at the areas where the web transitions to an orifice, areas 83a. Thus, in some embodiments, the thickness of the transition area 83a may be twice as thick as web 83 itself. In other embodiments, the transition areas may be only slighter thicker, with perhaps a 10-25 percent increase in thickness. Other embodiments may have a thickness increase from 25 percent to 75 percent, or at least a 90% increase in thickness, or a 100% increase in thickness. Yet other embodiments may have a transition area that is more than twice as thick as the web, i.e., an increase of more than 100%. As can be seen in FIG. 8A, the increase in thickness of the web 83, i.e., the stress attenuator 83a, is distributed equally on both sides of the web. Other proportions may be used.

Note that when arm 80 is molded, it is important that internal corners 83b are rounded or radiused, as well as external corners 83c, such as those formed about orifice area 83a. Thus, where the wider web portion 83a meets web 83 having nominal thickness, the internal corner 83b should be radiused. In a similar manner, external corners 83c should also be rounded. Note that areas of web 83 with a nominal thickness have a rectangular cross section. In one embodiment, internal and external corner radii of 3/32 inch (0.09375 inches or 2 mm) may be used; in another embodiment, corner radii of 1/16 inch (0.0625 inches or 1.6 mm) may be used. Other corner radii, internal and external corners, may be used. Different internal and external corner radii may be used.

In testing, it was found that the improved arm could withstand a maximum load of 1800 pounds 89a placed just inside lip 89 on the upper flange. Finite element analysis (FEA) showed that this resulted in a point of maximum stress of 24 ksi at a point 89b on the outer portion of the outer-most orifice 88. The load, stress and deflection are shown graphically in FIG. 8B.

Note by comparison, the prior art arm of FIGS. 7, 7A and 7B could withstand only 1300 pounds of force. Further testing with the stress attenuator's increased thickness, showed that if the force applied was 1300 pounds, the point of maximum stress remained the same, but with a maximum stress of 17 ksi, an improvement (stress reduction) of 1 minus 17 ksi divided by 24 ksi, equal to 0.29, which multiplied by 100%, equals 29%. Accordingly, an increased interface thickness may be considered a stress attenuator. Alternatively, for a given maximum stress, say 24 ksi, the stress attenuator feature may be considered to increase the load-bearing capacity of the arm, in this case from 1300 lbs. to 1800 lbs. This is an increase of 38 percent, a significant increase.

Figure 9:
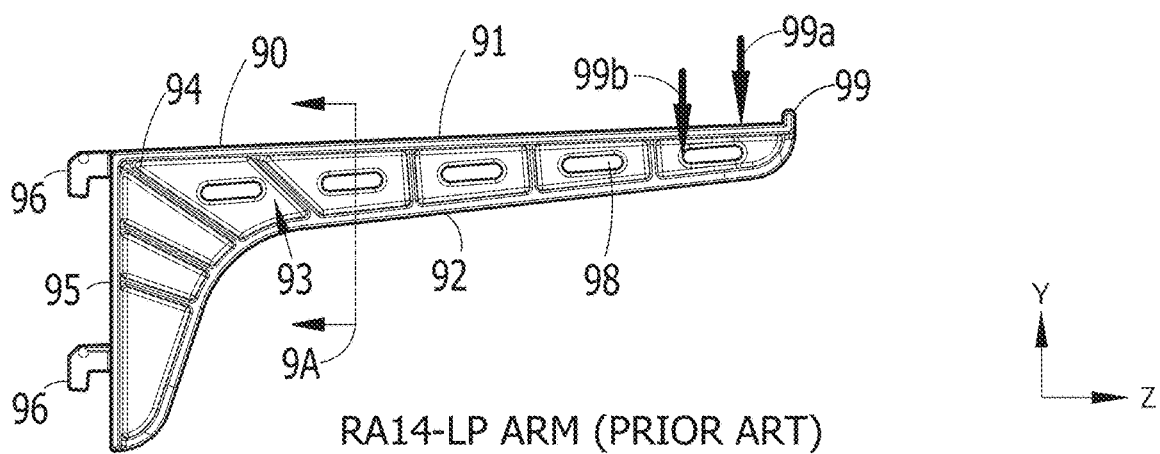
FIG. 9 depicts a side view of another prior art cross arm.
Figure 9A:
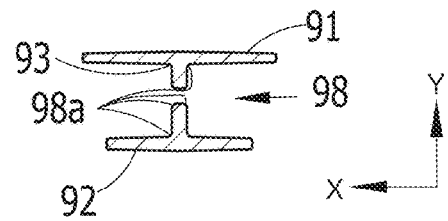
FIG. 9A depicts a cross-sectional view of the web of FIG. 9.
Figure 9B:
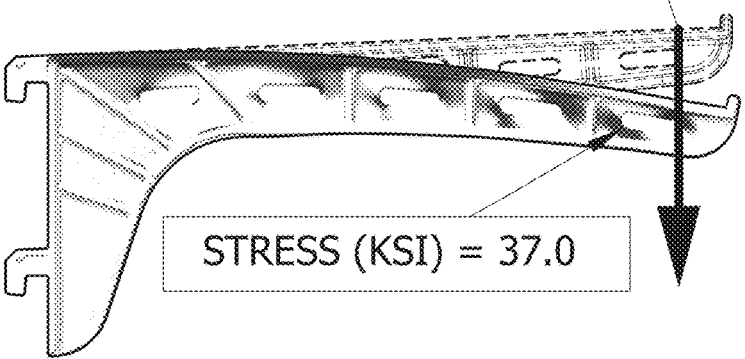
FIG. 9B depicts stresses on the prior art cross arm of FIG. 9 when a load is applied.

An additional example is given in FIGS. 9, 9A and 9B. FIG. 9 depicts a standard prior art cross arm 90, a shorter cross arm termed an RA-14 LP. Cross arm 90 includes a horizontal upper flange 91, lower flange 92, web 93, ribs 94, vertical side portion 95 and angled brackets 96, 96a. Arm 90 also has a lip 99 on a distal end of the arm, while vertical side portion 95 and angled brackets 96, 96a are positioned on a proximal end of the arm, forming an interface area of the arm, for interfacing with a stanchion into which the arm will be assembled. Note that the top angled bracket 96 has a "dot" interference feature and the lower angled bracket 96a has the "dot" interference feature and a projection cylindrical interference feature. Cross arm 90 may include one or more apertures or orifices 98 that are suitable for use with cable ties (not shown). FIG. 9A is a cross-sectional view of FIG. 9. The orifice 98 is depicted in FIG. 9A as an opening in web 93, which is depicted here as having a nominal, uniform thickness. In testing, it was found that the prior art RA-14 LP arm could withstand a maximum load of 1300 pounds 99a placed just inside lip 99 of the upper flange 91. Finite element analysis (FEA) showed that this resulted in a point of maximum stress of 37 ksi at a point 99b on the inner portion of the outer-most orifice 98. The load, stress and deflection are shown graphically in FIG. 9B. As noted above, internal and external corners 98a should be rounded and generously radiused.

The present disclosure may be better understood with reference to FIGS. 10, 10A and 10B. FIG. 10 depicts an RA-14 LP cross arm 100 according to the present disclosure in which the areas surrounding the apertures or orifices have been reinforced by increasing the thickness of the web surrounding these apertures. Cross arm 100 includes a horizontal upper flange 101, lower flange 102, web 103, ribs 104, vertical side portion 105, angled interface brackets 106, 106a. Arm 100 also has a lip 109 on a distal end of the of the arm, while vertical side portion 105, and angled brackets 106, 106a are positioned on a proximal end of the arm, for interfacing with a stanchion into which the arm will be assembled. Note that the top angled bracket 106 has a "dot" interference feature and the lower angled bracket 106a has the "dot" interference feature and a projection cylindrical interference feature. As noted previously, cross arm 100 may include one or more apertures or orifices 108 that are suitable for use with cable ties (not shown) for securing power and communications cables.

FIG. 10A is a cross-sectional view of FIG. 10, depicting upper flange 101, lower flange 102, web 103 and orifice 108. The nominal thickness of web 103 is increased at the areas where the web transitions to an orifice, areas 103a. Thus, in some embodiments, the thickness of the transition area 103a may be twice as thick as the nominal thickness of web 103 itself. In other embodiments, the transition areas may be only slighter thicker, with perhaps a 25-50 percent increase in thickness. Other embodiments may have a thickness increase from 50 percent to 100 percent. Yet other embodiments may have a transition area that is more than twice as thick as the web, i.e., an increase of more than 100%. As noted previously, all transitions or corners in the web, such as corners 103b, 103c and its transitions should be gently radiused to avoid sharp corners and abrupt transitions. This helps to prevent stress concentration cracking in stressed areas and insures longer useful lives for this equipment.

As stated, FIG. 10 depicts an improved cross arm RA-14 LP of the present disclosure. In testing, it was found that the arm could withstand a maximum load of 2000 pounds 109*a* placed just inside lip 109 of the upper flange. Finite element analysis (FEA) showed that this resulted in a point of maximum stress of 37 ksi at a point 109*b* on the inner portion of the outer-most orifice 108. The load, stress and deflection are shown graphically in FIG. 10B. Note by comparison, the prior art arm of FIGS. 9, 9*a* and 9B could withstand only 1300 pounds of loading. Further testing with the increased thickness of the stress attenuator showed that if the load applied was 1300 pounds, the point of maximum stress remained the same, but the maximum stress was 24 ksi, an improvement (stress reduction) of 1 minus 24 ksi divided by 37 ksi, that is, 0.35, which multiplied by 100%, equals 35%. Accordingly, and as noted above in the examples for the RA-20 LP arm, increasing the interface thickness of the web may be considered a stress attenuator. Alternatively, for a given maximum stress, say 37 ksi, the stress attenuator feature may be considered to increase the load-bearing capacity of the arm, in this case from 1300 lbs. to 2000 lbs. This is an increase of 54 percent, and may well give a longer life for the use of this equipment.

As discussed above, embodiments of the cable arms described herein are preferably molded from plastic or composite materials. In this context, such materials include any resinous, thermoset, or thermoplastic matrix material, including materials that are reinforced or otherwise altered, and which are formed by molding. In one embodiment, nylon with short glass fibers is used to make strong, stiff, and environmentally-resistant rack arms. In the present context, short glass fibers means glass fibers from about $\frac{1}{8}$" (about 3 mm) long to about $\frac{1}{4}$" (about 6 mm) long. Long glass fibers, from about $\frac{3}{16}$" (about 5 mm) to about $\frac{3}{8}$" (about 10 mm) may be used instead. Medium-length glass fiber reinforcements may also be used. Other embodiments may use less costly materials, such as polyethylene or polypropylene, for applications in which not as much strength is required. The plastic materials may also include particulate fillers, such as aluminum oxide or calcium carbonate, or any other filler useful in plastics molding, such as fire retardant additives or flame-retardant additives. Glass fibers with diameters from about 0.009 mm (0.00035 in) to about 0.011 mm (0.00043 in) may be used for reinforcement. Fibers with other diameters may also be used.

In addition to cable arms, the stanchions may also be molded from non-metallic materials. Stanchions may be injection molded, thermoformed, transfer molded, compression molded, or even pultruded. Typical polymers or resins include polyester, such as standard polyester, fire-retardant polyester, vinyl ester and fire-retardant vinyl ester. In addition to a thermoplastic or thermoset resin, the stanchions may include a reinforcement, such as glass fibers. Parts that are discretely molded, one at a time, may include chopped or short glass fibers, as mentioned above. Those parts or parts that are pultruded may also be made with unidirectional fiberglass roving, continuous strand multidirectional glass fiber mat and stitched woven fiberglass roving. The reinforcements add longitudinal and transverse strength and stiffness. In one embodiment, a stanchion may have a single layer of pultruded composite. In another embodiment, the stanchion may have an additional layer, such as a first layer with a reinforcement transverse to a direction of pultrusion and a second layer parallel to the direction of pultrusion. In one embodiment, the first layer may be transverse plus or minus fifteen degrees to a direction of travel of the pultrusion. An outer surface veil mat may also be used to add UV resistance and hand-friendliness to the resin-rich surface. If greater strength or stiffness is desired, carbon fiber reinforcement may also be used in addition to or in lieu of glass fiber. Some of the embodiments discussed below may advantageously made from pultruded plastic materials.

In one embodiment, pultruded C-channels are made with about from about 30 to about 40 weight %, e.g., 33%, unidirectional fiberglass roving and about 10 to about 25 weight %, e.g., 17%, continuous multidirectional glass fiber mat. Higher or lower loadings of reinforcement may be used. The mat is believed to especially increase the strength and stiffness of the corners of the pultrusion. In other embodiments, unidirectional roving is stitched together with transverse glass or cotton fibers to form a stitched woven fiberglass roving. The stitching helps to orient and control the roving and make it easier to pull into the tooling. The proportion of the reinforcements may vary within reasonable limits consistent with the desired strength and stiffness, e.g., from about 35% to 65%, or even higher. In other embodiments, only the continuous multidirectional glass fiber mat may be used. In still other embodiments, other forms and orientations of reinforcement may be used. All are intended to be within the scope of the present disclosure. A few specific embodiments are discussed below with reference to FIGS. 11-15, et. seq.

The pins, fasteners, used to mount the cable rack arms to stanchions may also be molded from plastic materials. The pins are desirably injection molded, but they may also be compression molded, pultruded and/or machined. It will be clear to those with ordinary skill in the art that the pins support a shear load caused by the cable rack arm and the cables loaded onto the arm. Accordingly, reinforcements, such as glass fibers, that are longitudinally oriented in the direction of the shaft of the pin, will be helpful in supporting the load and resisting deformation. This may be achieved by using glass-reinforced plastic materials. The desired orientation may also be achieved by using wider gates in injection molding the pins. It has also been found during experiments that molding the pin with a reservoir, attached to the end of the pin opposite the gate with a small orifice, causes additional plastic flow and helps to orient the fibers in the direction of flow, during the injection molding process. Pins used to attach cable rack arms to a stanchion are considered fasteners because they aid in the mechanical assembly of the cable rack arm to the stanchion.

Underground cable racks face several constraints for successful service. One of these constraints is that the stanchions or posts generally include penetrations in both the stanchions and the arms so that the stanchions or posts may be attached to the walls or surfaces of the manholes or other underground installations in which they are placed. If cable rack arms are not integral with the stanchions, there are then more penetrations so that the rack arms may be installed, to hold cables for power or communications. Each such penetration may be considered as a stress concentrator, a point in the structure at which stresses will be more likely to cause failure.

Figure 11:
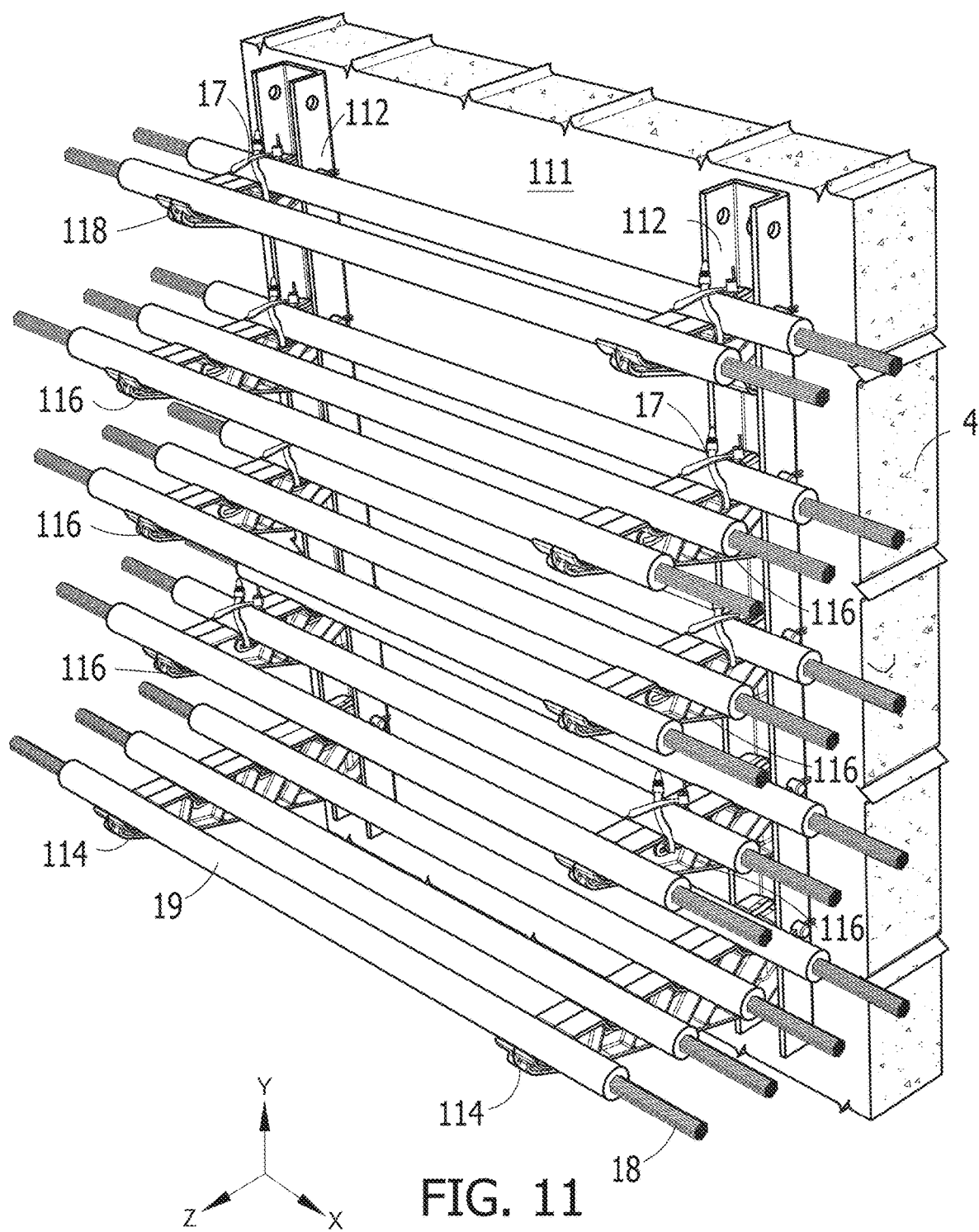
FIG. 11 is a front perspective view of another embodiment of the present disclosure.

Additional embodiments of the disclosure are depicted in FIG. 11, which depicts an underground cable installation 111 with two stanchions 112 secured to concrete wall 4 via bolts (bolts not visible in FIG. 11). The stanchions may be existing metallic stanchions, such as double flange steel stanchions (see FIG. 12) or single flange steel stanchions fitting into groove 130*e* (see FIG. 13). Alternatively, the stanchions may be non-metallic, such as non-metallic C-channel stanchions 112. In this instance, each stanchion is used to mount a first cable rack arm 114, three cable rack arms 116, and final cable rack arm 118. Cable rack arm 114 has four position places or saddles on the top portion of the rack arm for mounting power or communications cables 18 along with a conduit or insulation 19. Each cable rack arm 116 has three position places or saddles on top for mounting cables. The final cable rack arm 118 has two position places for mounting cables. Of course, other embodiments may have only a single mount or may have additional mounts, such as an arm with a five mounts or saddles. Further, some embodiments may require that the top surface of the arm be flat. One advantage of the embodiments depicted herein is that the mounts or saddles are formed integrally with the rack arms themselves. Thus, in these embodiments, no adapters or additional parts need to be assembled before installing and using the rack arms. The portions of the rack arms nearest the stanchion are referred to as the proximal portions, while the portions of the rack arms farthest removed from the stanchion are the distal portions. The proximal portions of the rack arms form an interface for mounting to the stanchion.

Figure 12:
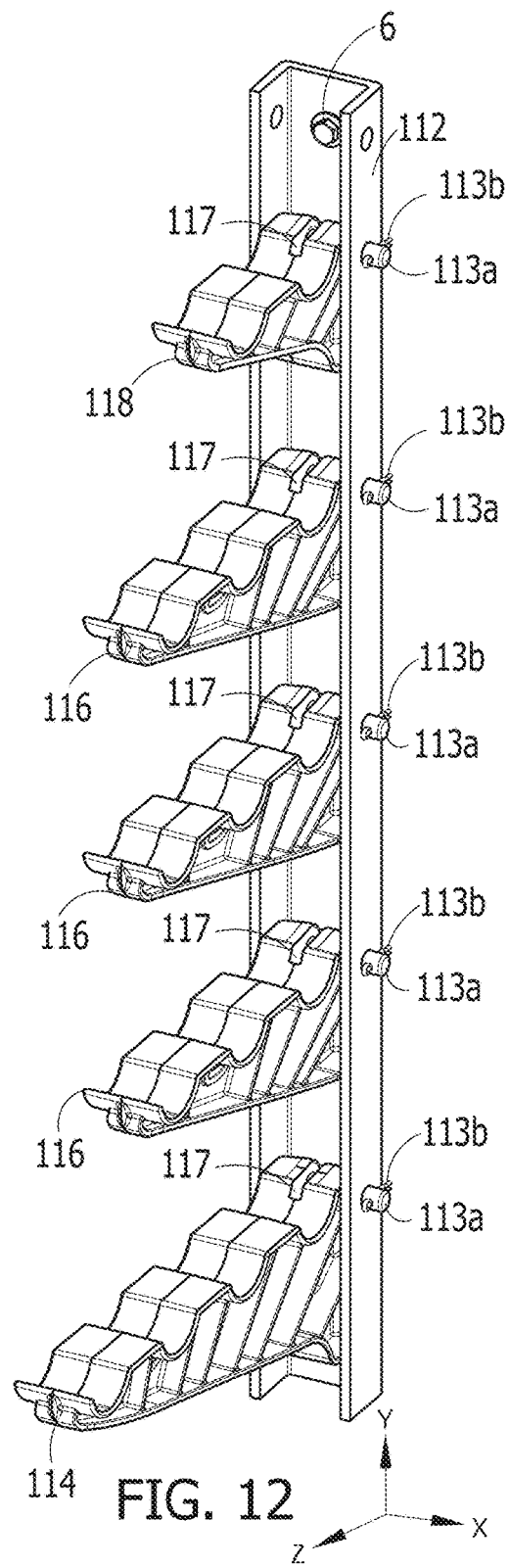
FIG. 12 is a closer-view of the installation of FIG. 12, showing details of the arms.

A closer perspective view of the installation is depicted in FIG. 12, showing pultruded plastic stanchion 112 with the cable rack arms described above with reference to FIG. 11. The stanchion is secured to the concrete wall (not shown) via one or more bolts 6 using holes or apertures (see FIGS. 14, 14A and 14B) that are molded into the stanchion. Alternatively, the holes or orifices could be machined or stamped into the stanchions. FIG. 14 is a front perspective view of stanchion 112, FIG. 14A is a rear perspective view of the stanchion. Stanchion 112 has a C-shaped cross section formed by web 112a and flanges 112b on either side of web 112a. The stanchion flanges may also have openings or orifices 112c for mounting cable rack arms. The web 112a may include orifices or openings 112d for mounting to a mounting surface, such as a concrete wall, via bolts as discussed above. FIG. 14B is a close-up view of mounting orifice 112d, having an oval shape, for mounting the stanchion to a wall or other mounting surface. The rack arms 114, 116, 118 are mounted to channel stanchion 114 via mounting pins 113a, secured with cotter pins 113b. The proximal or interface portion of the rack arms 114, 116, 118 include mounting holes or orifices for mounting pins 113a so the pins can secure the rack arms to stanchion 112.

Figure 13:
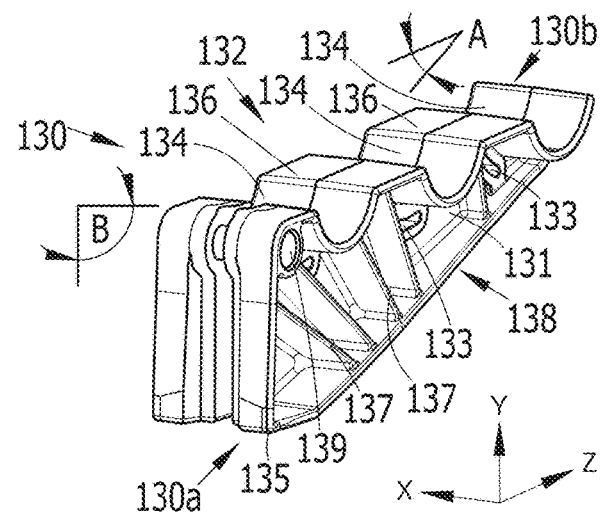
FIG. 13 is a rear-perspective view of one of the arms of FIGS. 11-12.

The close-up view of FIG. 13 provides details of the configuration of mount arm 130, which may be the same as mount arm 116 or may be different. Cable rack arm 130 has a proximal portion 130a, for the portion of the rack arm that when mounted will be nearest to the stanchion, and a distal portion 130b, which will be mounted away from the stanchion. The cable rack arm 130 has an upper portion 132 and a lower portion 138, the upper and lower portions acting as flanges that are connected via central web 131. Web 131 has a nominal thickness in most areas of arm 130. The cable rack arm thus has a cross section with a web and flanges, akin to an I-beam or an H-beam, and has increased section modulus and strength. This increased stiffness or strength makes cable installations more stable and reliable. In addition, a number of ribs 137 extend between the lower portion 138 and the vertical portion 135 or the upper portion 132. These ribs help to strengthen and stiffen the rack arm for supporting what can be very heavy loads from power and/or communications cables. Cable rack arm 130 also has three horizontal tie-down openings or orifices 133, in which the third orifice, nearest the proximal end 130a, is only partly visible in FIG. 13. These orifices or openings may be used in conjunction with cable ties or other suitable fasteners to secure power or communications cables, or both, to the rack arm. Note that the areas of the web 131 immediately adjacent openings 133 are considerably thicker than the remainder of the web. See FIGS. 13, 13A, 15 and 15B.

Upper portion 132 in this embodiment includes three cable rack saddles or mounts 134, the mounts separated by upper flat surfaces 136. Upper portions of the ribs may extend from the undersides of the upper flat surfaces 136, from the undersides of the cable rack mounts 134 or from the vertical portion 135. The ribs extend to the lower portion 138. Lower portion 138, further described below, is mounted at an acute angle A to the upper portion surface 132. The angle is less than 90°, and desirably less than 60°. The imaginary apex of the angle will be to the right of the mount arms, as also shown in FIG. 13. In practice, angle A may range from about 15 degrees to about 47 degrees, from 10 degrees to about 50 degrees, or from about 20 degrees to about 30 degrees.

FIG. 13 also depicts the proximal portion 130a of the rack arms, the proximal portion being the end for use near the stanchion. The distal portion 130b is the end of the arm away from the stanchion. The proximal portion includes a rear surface vertical portion 135, a portion of which is flat and may be formed at an obtuse angle B to the flats 136 on the top portion 132, an obtuse angle being an angle greater than 90°. The obtuse angle of these flats on the rear or proximal surface prevents downward rotation of arm 130 past the point where the material of the rear surface meets the inner surface of the channel 112. The obtuse angle B in one embodiment is about 91.5 degrees and may range from about 90.5 degrees to about 95 degrees in practice, although other angles may be used, such as a right angle or an acute angle. Having angle B at 91.5° results in the flats 136 and the saddles 134 having an upward tilt of 1.5°. This upward tilt compensates for the deformation of the arm when it is under load by very heavy power and communication cables. Thus, rack arm 130 will be biased to some extent for upward tilting of the rack arm on its distal end, near angle A. In other embodiments, it may be desirable for the rack arm top surface 136 and saddles 134 to be at a nominal angle different from horizontal (90°). Thus, other embodiments may include cable rack arms designed for an orientation of 30°, 45°, 60° or other angle from horizontal. These angles may be useful for maintenance of the cables after installation.

Additional details of rack arm 130 are seen in FIG. 13, which is a close-up view of the rack arm. Proximal portion 130a also includes slot 130e, separating the proximal portion into two halves. Slot 130e provides space that allows cable rack arm 130 to accommodate a single wall stanchion, not shown, as opposed to a C-shaped stanchion, for easy mounting. The halves on either side of slot 130e each includes a mounting hole 139. The holes thus allow insertion of a mounting pin, such as mounting pin 113a, and its securing cotter pin 113b, through mounting holes 112c of the stanchion 112, as well as the cable rack arm 130 itself. Rack arm horizontal mounting holes 139 in this embodiment are below the top surface of the rack arm 130. In other embodiments, the mounting holes 139 of proximal portion 130a may be molded above the top surface 136. In yet other embodiments, mounting holes 139 may be molded such that the center of the horizontal orifices 139 are above the top surface 136 of upper portion 132. The mounting holes 139 are used in all types of stanchions, while the slot 130e is typically needed only for a single-flange steel stanchion, a TEE-bar stanchion, an L-angle stanchion and an E-channel stanchion (none of these shown), but not a C-channel stanchion.

The cable rack arm embodiments described herein can be used for existing double flange steel stanchions as described and may also be used for non-metallic C-channel, L-angle, TEE-bar or E-channel stanchions. Each slot 130e or interface also includes a void or relief 117 (see FIG. 12), the relief in the shape of about a 45-degree angle to the top of the rack arm at the top of the slot and visible from the distal end of the rack arm. Thus, in one embodiment, the interface or proximal portion of the rack arm includes contiguous mounting holes 139, slot 130e and relief 117. When the arm 130 is attached to a double flanged stanchion, a TEE-angle stanchion, an L-angle stanchion, or an E-channel stanchion, relief 117 allows upward rotation of the rack arms from their deployed horizontal position as depicted in FIGS. 11-12.

In other embodiments, the angle between the top surface and the rear or proximal side may be close to 90°, that is, a right angle. In these embodiments, the cable rack arm may be viewed as a three-dimensional right triangle, with the long side or hypotenuse being the angled side on the bottom, that is, the bottom or lower portion. The top or longer portion is the major cathetus of the triangle and the side or shorter portion forms the minor cathetus of the triangle. The sides of the triangle may be connected by a web, a web with ribs, or a gusset. In this patent, the terms major cathetus and minor cathetus intend the top and side portions of a cable rack arm, respectively, whether or not the angle between them is a right angle.

Figure 13A:
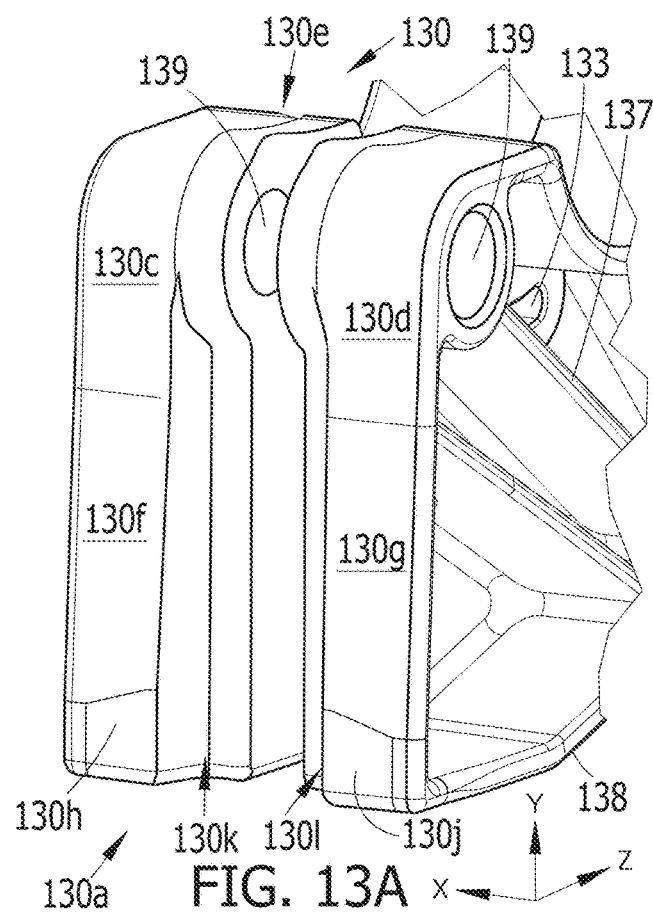
FIG. 13A is a close-up perspective view of the arm of FIG. 13.

A closer, rear perspective view of the cable rack arm 130 is depicted in FIG. 13A. Cable rack arm 130 and lower portion 138 include a proximal portion 130a, for placement nearer the mounting stanchion. As noted above, slot 130e separates the proximal portion 130a into left and right halves 130c, 130d with flat portions 130f, 130g, respectively. In FIG. 13A, rhomboid sections 130h and 130j may be molded flat to fit snugly against C-channel, TEE bar, L-angle and E-channel stanchions on which the cable arm is mounted. These are the flat sections discussed above that may be oriented from about 90.5 to 95 degrees to the plane of the top surface of the cable arm. Side reliefs 130k, 130l allow use of the adjustable cable rack arms in existing double flange stanchions having substantial weld formations that would otherwise interfere with their installation, e.g., stanchion mounting bolt clearance. The cable rack arm 130 is wider nearer proximal end 130a than its distal end 130b.

Downward rotation of the arm 130 may be stopped by surfaces 130h, 130j, heel stops, when the arm is attached to a C-channel stanchion. In the case of L-angle, TEE-bar, or E-channel stanchions, the heel stops of either or both surfaces 130h, 130j may be used to stop downward arm rotation. With single-flange stanchions, such as the older single-flange stanchions, the end of slot 130e may act as a heel stop for the cable rack arm. See FIG. 24A, which depicts slot 223e ending in the non-metallic material from which the rack arm is made. The end of the slot acts as the heel stop, and this will also apply to rack arms such as those depicted in FIGS. 12-13A and FIGS. 15, 16, 17, 18, 19, 20, 21, 23 and 23A.

Figure 15A:
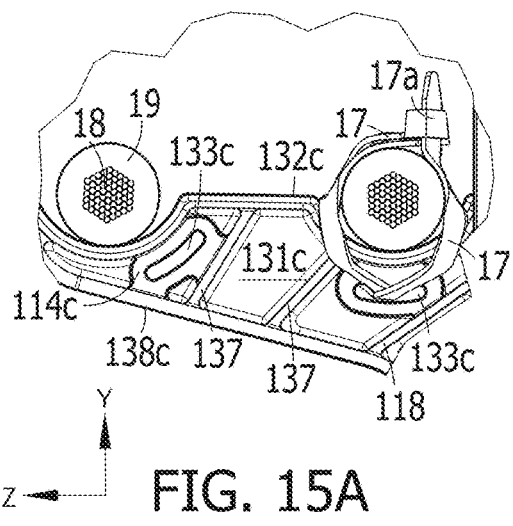
FIG. 15A depicts a close-up side view of the top arm of FIG. 15.
Figure 15B:
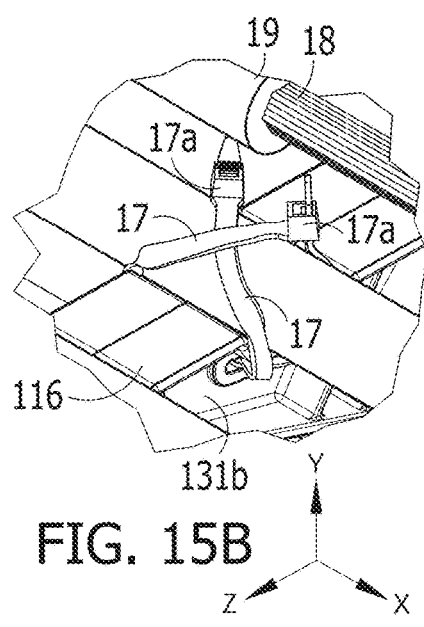
FIG. 15B depicts a front perspective view of one of the other arms of FIG. 15.
Figure 15:
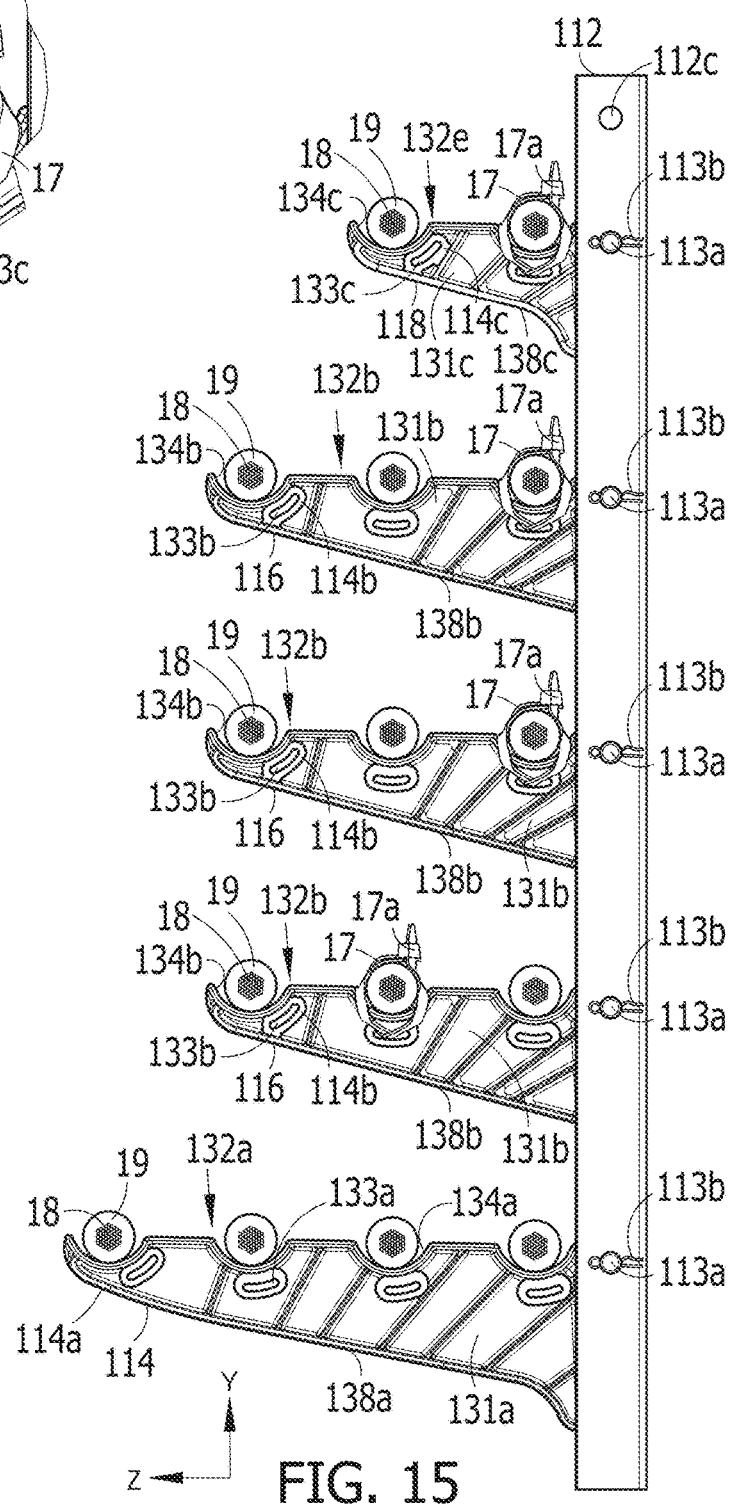
FIG. 15 depicts a side cross-sectional view of the installation of FIG. 11.

A closer look at an installation of the rack arms 114, 116, 118 is depicted in FIGS. 15, 15A and 15B. In these views, pultruded stanchion 112 is intended for mounting to a concrete wall or other suitable mounting. Visible is the right flange of stanchion 112, with one orifice 112c visible near the top of the stanchion, and with five other orifices not visible because each is filled with a mounting pin 113a and its cotter pin 113b. In this installation, a bottom A4 arm 114 includes four mounting saddles 134a near top portion 132a, and also includes four reinforced orifices 133a. Arm 114 has a web 131a with a nominal thickness in most areas of the web. Portions 114a of the web 131a nearest the orifices 133a are portrayed as thicker, as will be seen later in FIG. 17A. The installation also includes three A3 arms 116, each including three mounting saddles 134b near top portion 132b, and also includes three reinforced orifices 133b. Portions 114b of the web 131b nearest the orifices 133b are portrayed as thicker, as will be seen later in FIG. 19A. The installation also includes an A2 arm 118 with two mounting saddles 134c near top portion 132c, and also includes two reinforced orifices 133c. Portions 114c of the web 131c nearest the orifices 133c are portrayed as thicker, as will be seen later in FIG. 21A. As can be seen in FIG. 15, the openings 133a, 133b, 133c are parallel, or partly parallel to the saddles 134a, 134b, 134c atop each of the rack arms 114, 116, 118. The openings in one embodiment are about one-quarter inch (6 mm) wide, although other widths may be used. The openings may about one-half inch to one-inch (13 mm to 25 mm) long, although other opening lengths may be used.

FIG. 15A depicts a close-up view of the arm 118 of FIG. 15. Web 131c has a nominal thickness in most areas. Note, however, how portions 114c of web 131c are thicker near the orifices 133c. Of course, the ribs 137 are also considerably thicker than web 131c, the ribs typically extending the full width of the top portion 132c and the ribs narrowing so that the ribs also extend the full width of the bottom portion 138c. See FIG. 12, depicting each of the rack arms 114, 116, 118 having ribs that extend from top to bottom or from the proximal side to the bottom. The portions of the ribs nearest the top have a width equal to the width of the top, and the portions of the ribs nearest the bottom or side have a width equal to a width of the bottom or the side, which are typically more narrow than the width of the top or top flange. Other ribs with less than a full extension may also be used. The full-extension ribs are easier to manufacture and work well in the field.

It may be important to smooth all transitions between portions of the cross arms, such as cross arms 114, 116, 118. Any changes in part shape or thickness should be generously radiused, so that there are no sharp corners or abrupt transitions. Corner radii of 0.0625 inches to 0.125 inches may be used. In other examples, corner radii, internal and external, of ³⁄₃₂ inch, 0.09375 inches or another dimension may be used. As seen in FIGS. 13 and 13A for cross arm 130, there are many dimensional transitions between the central web 131 and the upper portion 132, between web 131 and ribs 137, and between central web 131 and orifice 133. The same holds true for the other cross arms 114, 116 118, as shown in FIG. 15. There should be generously radiused transitions between each central web 131a, 131b, 131c, and lower flange 138a, 138b, 138c, between web 131a, 131b, 131c and the ribs in each of the rack arms. There should also be gentle transitions between web 131a, 131b, 131c and the orifices 133a, 133b, 133c, and so forth.

Figure 16:
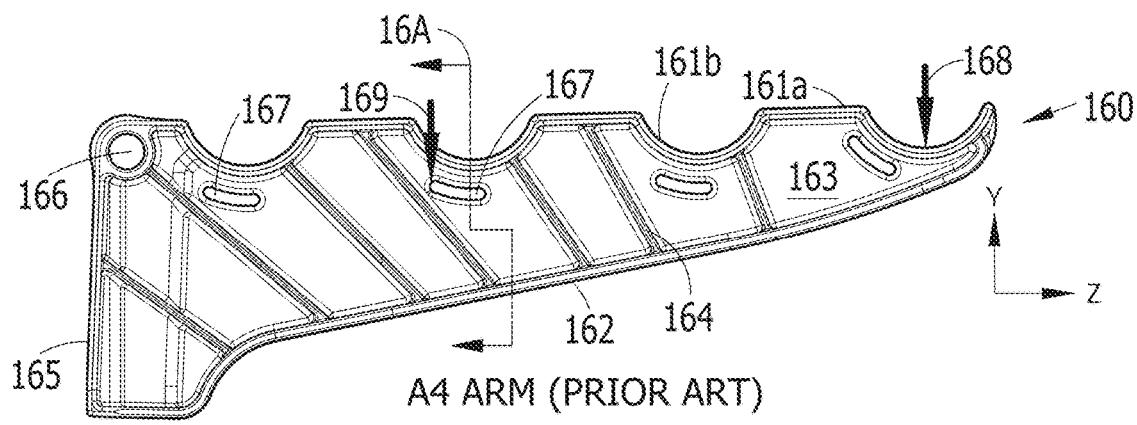
FIG. 16 depicts a side view of a prior art rack arm.
Figure 16A:
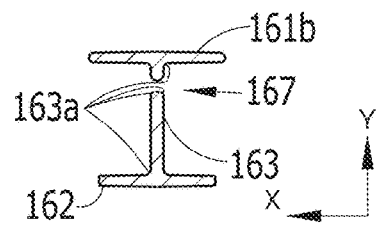
FIG. 16A depicts a cross-section of the prior art rack arm according to FIG. 16.
Figure 16B:
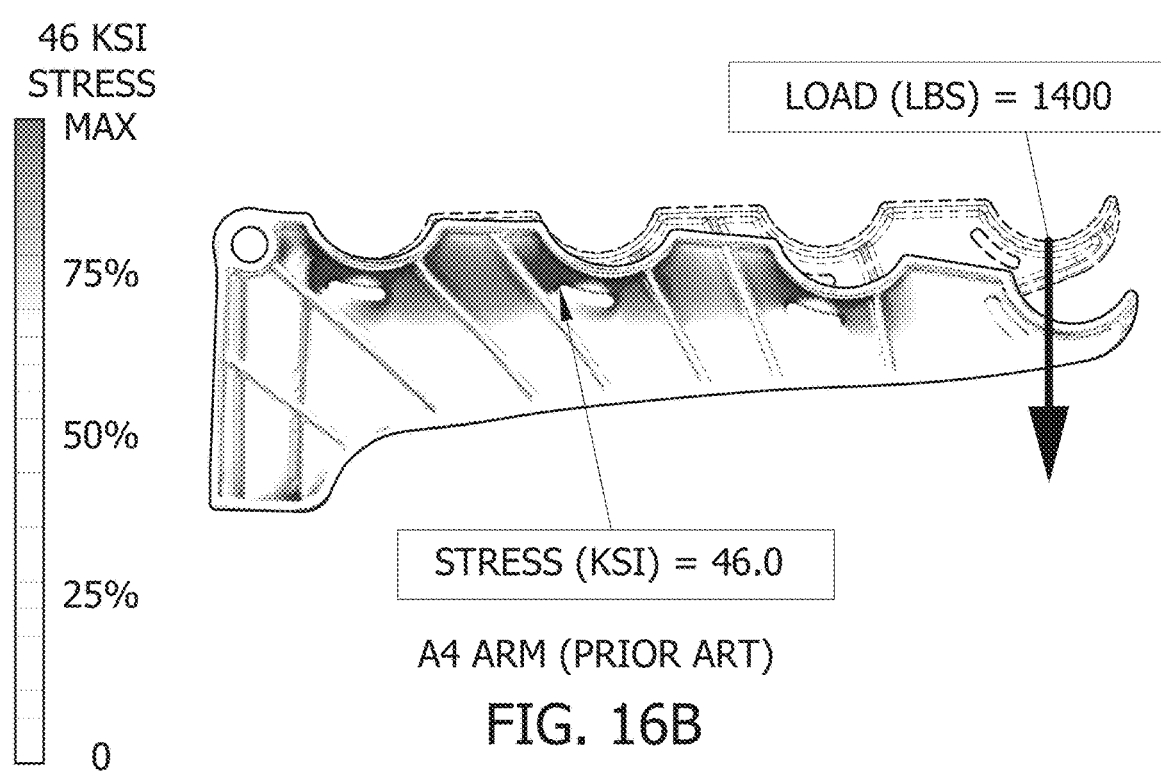
FIG. 16B depicts stresses on the prior art cross arm of FIG. 16 when a load is applied.

The situation may be better understood with reference to FIGS. 16, 16A and 16B. FIG. 16 depicts a standard prior art 4-saddle A4 rack arm 160 with an upper flat portion 161a interrupted by four saddle mounts 161b, and also includes lower flange 162, web 163, ribs 164, vertical side proximal portion 165 and mounting orifices 166. Web 163 has a uniform nominal thickness. Proximal portion 165 and mounting holes 166 constitute an interface portion of the rack arm for interfacing with a stanchion for mounting the rack arm. It is possible that one or more ribs 164 do not extend all the way from lower flange 162 to upper portions 161a, 161b, or to the vertical side 165. Rack arm 160 may include one or more apertures or orifices 167 that are suitable for use with cable ties (not shown) to secure power or communications cables or conduits to the rack arm. FIG. 16A is a cross-sectional view of FIG. 16. The orifice 167 is depicted in FIG. 16A as an opening in web 163. In testing this A4 rack arm of the prior art, it was found that the arm could withstand a maximum load of 1400 pounds placed in the center 168 of outermost saddle mount 161b. Finite element analysis (FEA) showed that this resulted in a point of maximum stress of 46 ksi at an in-board point 169 on the second of the four tie-down orifices. The load, stress and deflection are shown graphically in FIG. 16B. As noted previously, corners 163a should be generously radiused.

The present disclosure may be better understood with reference to FIGS. 17, 17A and 17B. FIG. 17 depicts an A4 rack arm 170 in which the apertures or orifices have been reinforced by increasing the thickness of the web surrounding the apertures. Rack arm 170 includes an upper flat portion 171a interrupted by four saddle mounts 171b, and also includes lower flange 172, web 173, ribs 174, vertical side proximal portion 175 and mounting orifices 176. The left side of the rack arm in this instance constitutes the interface portion of the rack arm, including side portion 175 and mounting orifices 176. It is possible that one or more ribs 174 do not extend all the way from lower flange 172 to upper portions 171a, 171b, or to the vertical side 175. Rack arm 170 may include one or more apertures or orifices 177 that are suitable for use with cable ties (not shown).

FIG. 17A is a cross-sectional view of FIG. 17. The orifice 177 is depicted in FIG. 17A as an opening in web 173. Note that web 173 has a nominal thickness in most areas of the rack arm, but in areas near orifices 177, the web is much thicker. Note that areas of web 173 of nominal thickness have a rectangular cross section. Thus, FIGS. 17 and 17A depict an improved A4 rack arm with areas surrounding the orifices thicker than other, nominal areas of web 173. In some embodiments, the thickness of the web area 177a near orifice 177 may be twice as thick as web 173 itself. In other embodiments, the reinforced areas may be only slighter thicker, with perhaps a 10-25 percent increase in thickness. Other embodiments may have a thickness increase from 25 percent to 75 percent. Yet other embodiments may have a transition area that is more than twice as thick as the web, i.e., an increase of more than 100%. In one example, web 173 has a nominal thickness of $9/32$ inches (0.281 inches, 7 mm), and areas of the web near orifices 177 are twice as thick, $9/16$ inches (0.5625 inches, 14 mm) Other web thicknesses may be used and other stress attenuator thicknesses may be used. Note that in this embodiment, the reinforced area 177a extends from the bottom of the upper surface, e.g., from the bottom of the saddle mounts 171b to the orifice 177. This may also be an advantage in tooling, in that there is at least one less transition for the manufacturer of the part. As noted above, all transitions in thickness should be gentle, with no sharp corners and generously-radiused transitions.

As noted, FIGS. 17-17A depict an improved rack arm according to the present disclosure. In testing, it was found that the arm could withstand a maximum load of 2200 pounds 178 placed in the center of the outermost-saddle mount. Finite element analysis (FEA) showed that this resulted in a point of maximum stress of 46 ksi 179 at an inboard point on the second of four tie-down orifices. The load, stress and deflection are shown graphically in FIG. 17B. Note by comparison, the prior art arm of FIGS. 16 and 16A could withstand only 1400 pounds of load. Further testing showed that if the force applied was 1400 pounds, the point of maximum stress remained the same, but with a maximum stress of 29 ksi, an improvement (stress reduction) of 1 minus 29 ksi divided by 46 ksi, that is, 0.37, which multiplied by 100 percent, equals 37%. Accordingly, an increased interface thickness around the openings or orifices may be considered to be a stress attenuator. Alternatively, for a given maximum stress, 46 ksi, the stress attenuator feature may be considered to increase the load-bearing capacity of the arm, in this case from 1400 lbs. to 2200 lbs. This is an increase of 57 percent, a significant increase.

Figure 18:
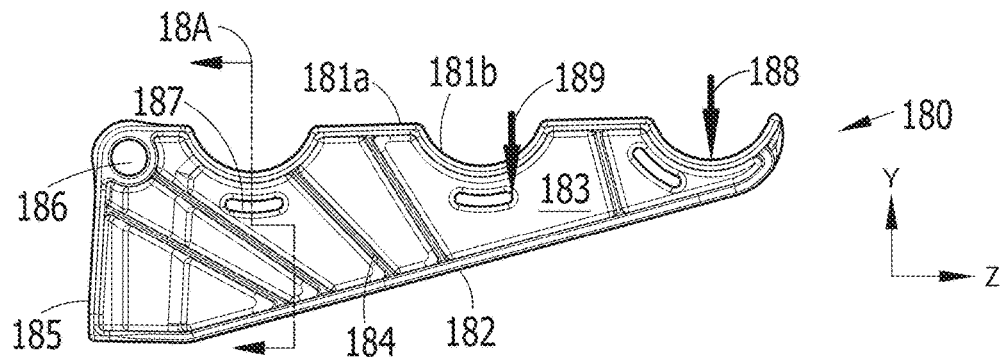
FIG. 18 depicts a side view of another prior art rack arm.
Figure 18A:
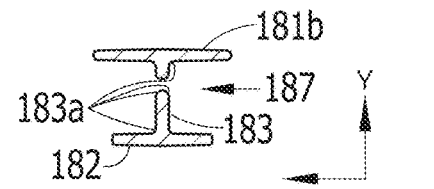
FIG. 18A depicts a cross-section of the prior art rack arm according to FIG. 18.
Figure 18B:
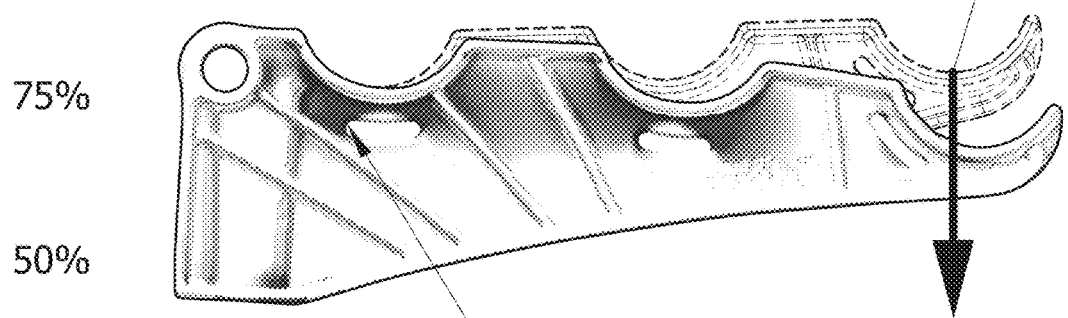
FIG. 18B depicts stresses on the prior art cross arm of FIG. 18 when a load is applied.

Next for consideration is an A3 rack arm, with reference to FIGS. 18, 18A and 18B. FIG. 18 depicts a standard prior art 3-saddle A3 rack arm 180 with an upper flat portion 181a interrupted by three saddle mounts 181b. This A3 arm also includes lower flange 182, web 183, ribs 184, vertical side proximal portion 185 and mounting orifices 186. Proximal portion 185 and mounting holes 186 constitute an interface portion of the rack arm for interfacing with a stanchion for mounting the rack arm. Web 183 has a uniform, nominal thickness. It is possible that one or more ribs 184 do not extend all the way from lower flange 182 to upper portions 181a, 181b, or to the side 185. Rack arm 180 may include one or more apertures or orifices 187 that are suitable for use with cable ties (not shown). FIG. 18A is a cross-sectional view of FIG. 18. The orifice 187 is depicted in FIG. 18A as an opening in web 183. As noted, FIG. 18 depicts an A3 rack arm of the prior art. In testing, it was found that the arm could withstand a maximum load of 1600 pounds placed in the center 188 of the outermost saddle mount. Finite element analysis (FEA) showed that this resulted in a point of maximum stress of 39 ksi at an outer point 189 on the middle of the three tie-down orifices. The load, stress and deflection are shown graphically in FIG. 18B. External and internal corners 183a should be rounded.

An improved version of an A3 rack arm is disclosed in FIGS. 19, 19A and 19B. In improved A3 rack arm 190, the apertures or orifices have been reinforced by increasing the thickness of the web surrounding the apertures. Rack arm 190 includes an upper flat portion 191a interrupted by three saddle mounts 191b, and also includes a lower flange 192, web 193, ribs 194, vertical side proximal portion 195 and mounting orifices 196. Proximal portion 195 and mounting orifices 196 constitute an interface for mounting the rack arm to a stanchion. It is possible that one or more ribs 194 do not extend all the way from lower flange 192 to upper portions 191a, 191b, or to the side 195. Rack arm 190 may include one or more apertures or orifices 197 that are suitable for use with cable ties (not shown). FIG. 19A is a cross-sectional view of FIG. 19. The orifice 197 is depicted in FIG. 19A as an opening in web 193. FIG. 19 depicts an improved A3 rack arm. Areas of the web surrounding the orifices are noticeably thicker than other areas of web 193.

In some embodiments, the thickness of the web area 197a near orifice 197 may be twice as thick as web 193 itself. In other embodiments, the reinforced areas may be only slighter thicker, with perhaps a 10-25 percent increase in thickness. Other embodiments may have a thickness increase from 25 percent to 75 percent. Yet other embodiments may have a transition area that is more than twice as thick as the web, i.e., an increase of more than 100%. In one example, web 193 has a nominal thickness of $9/32$ inches (0.281 inches, 7 mm), and areas of the web near orifices 217 are twice as thick, $9/16$ inches (0.5625 inches, 14 mm), an increase of 100%. In another examples, the web has a nominal thickness of $5/16$ inches (0.3125 inches, 8 mm), and the stress attenuator has a thickness of $19/32$ inches (0.594 inches, 15 mm), a 90% increase. In other embodiments, thicknesses of less than 90% or more than 100% may also be used. Note that in this embodiment, the reinforced area 197a extends from the bottom of the upper surface, e.g., from the bottom of the saddle mounts 191b to the orifice 197. This may also be an advantage in tooling, in that there is at least one less transition for the manufacturer of the A3 arm. As noted above, all transitions in thickness should be gentle, with no sharp corners and generously-radiused transitions. Corners 197b, internal and external, should be rounded.

In testing the improved A3 rack arm, it was found that the arm could withstand a maximum load of 2500 pounds placed in the center 198 of the outermost-saddle mount. Finite element analysis (FEA) showed that this resulted in a point of maximum stress of 39 ksi at an outer point 199 on the middle of the three tie-down orifices. The load, stress and deflection are shown graphically in FIG. 19B. Note by comparison, the prior art arm of FIGS. 18 and 18A could withstand only 1600 pounds of force. Further testing showed that with 1600 pounds of load applied, the point of maximum stress remained the same, but with a maximum stress of 25 ksi, an improvement (stress reduction) of 1 minus 25 ksi divided by 39 ksi, that is, 0.36, which, multiplied by 100%, equals 36%. Accordingly, an increased interface thickness may be considered to be a stress attenuator. Alternatively, for a given maximum stress, 39 ksi, the stress attenuator feature may be considered to increase the load-bearing capacity of the arm, in this case from 1600 lbs. to 2500 lbs. This is an increase of 56 percent, a significant increase.

Figure 20:
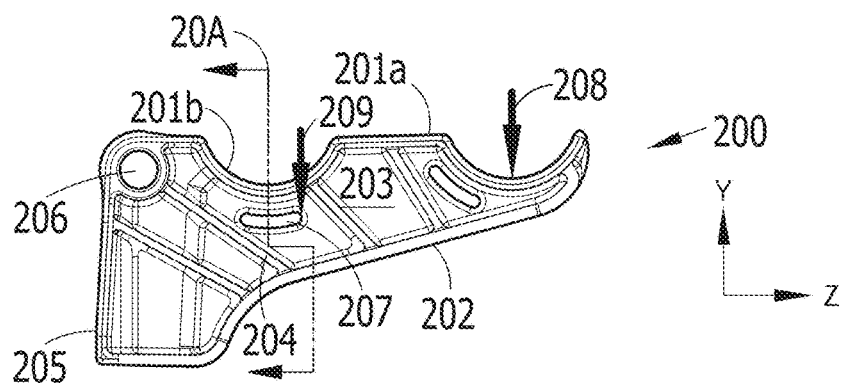
FIG. 20 depicts a side view of yet another prior art rack arm.
Figure 20A:
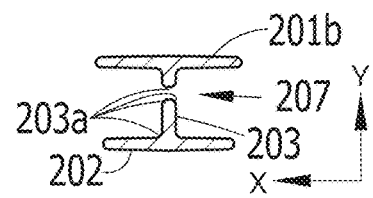
FIG. 20A depicts a cross-section of the prior art rack arm according to FIG. 20.
Figure 20B:
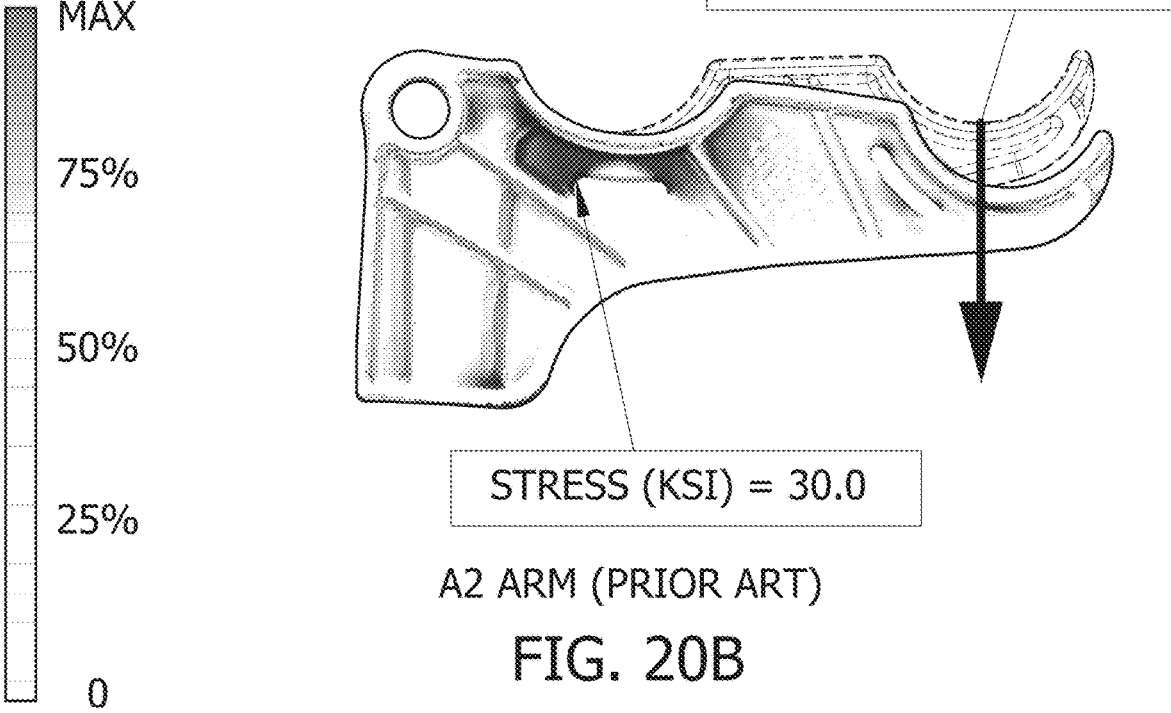
FIG. 20B depicts stresses on the prior art cross arm of FIG. 20 when a load is applied.

The next disclosure concerns an A2 rack arm, with reference to FIGS. 20 20A and 20B. FIG. 20 depicts a standard prior art 2-saddle A2 rack arm 200 with an upper flat portion 201a interrupted by two saddle mounts 201b. The arm also includes lower flange 202, web 203, ribs 204, vertical side proximal portion 205 and mounting orifices 206. Web 203 has a uniform, nominal thickness. The vertical side proximal portion and mounting orifices 206 provide an interface for mounting the rack arm to a stanchion. It is possible that one or more ribs 204 do not extend all the way from lower flange 202 to upper portions 201a, 201b, or to the vertical side 205. Rack arm 200 may include two apertures or orifices 207 that are suitable for use with cable ties (not shown) to secure power or communications cables to the arm. FIG. 20A is a cross-sectional view of FIG. 20. The orifice 207 is depicted in FIG. 20A as an opening in web 203. Corners 203a should be generously radiused. As noted, FIG. 20 depicts an A2 rack arm of the prior art. In testing, it was found that the arm could withstand a maximum load of 1800 pounds placed in the center 208 of the outermost saddle mount. Finite element analysis (FEA) showed that this resulted in a point of maximum stress of 30 ksi at an outboard point 209 on the inner tie-down orifice. The load, stress and deflection are shown graphically in FIG. 20B.

Figure 21:
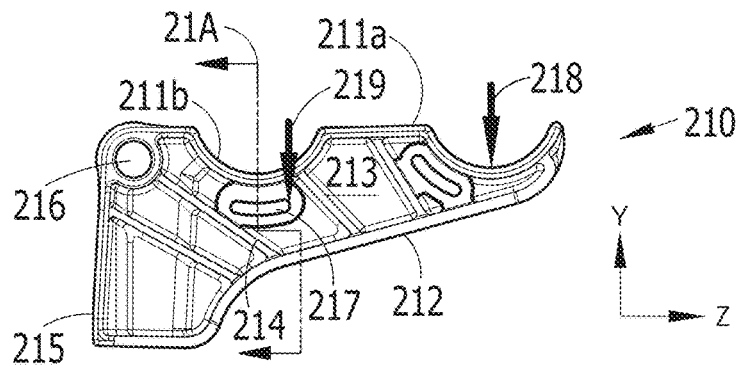
FIG. 21 depicts a side view of another rack arm according to the present disclosure.
Figure 21A:
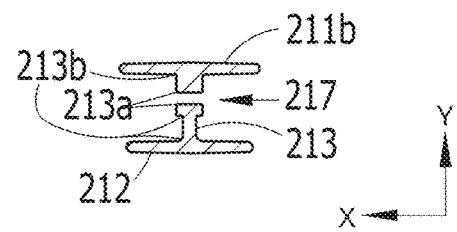
FIG. 21A depicts a cross-sectional view of the web of FIG. 21.
Figure 21B:
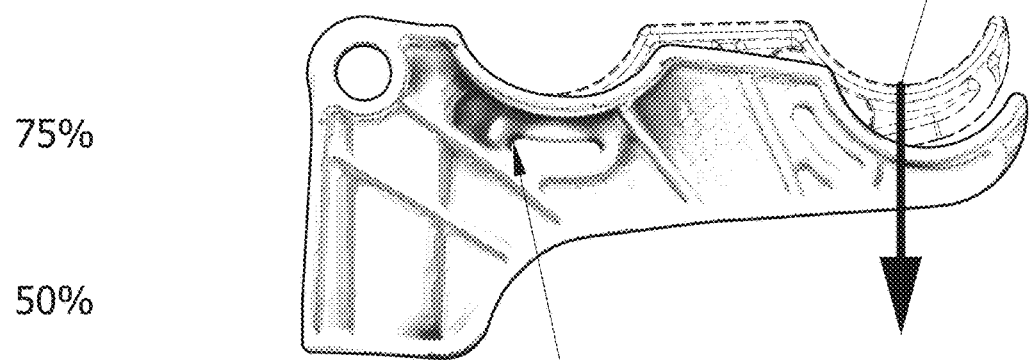
FIG. 21B depicts stresses on the cross arm of FIG. 22 when a load is applied.

An improved version of an A2 rack arm is disclosed in FIGS. 21, 21A and 21B. In improved A2 rack arm 210, the apertures or orifices have been reinforced by increasing the thickness of the web surrounding the apertures. Rack arm 210 includes an upper flat portion 211a interrupted by two saddle mounts 211b, and also includes lower flange 212, web 213, ribs 214, vertical side proximal portion 215 and mounting orifices 216. The vertical side portion 215 and mounting orifices 216 form an interface for mounting arm 210 to a stanchion. It is possible that one or more ribs 214 do not extend all the way from lower flange 212 to upper portions 211a, 211b, or to the vertical side 215. Rack arm 210 may include two apertures or orifices 217 that are suitable for use with cable ties (not shown) as described previously.

FIG. 21A is a cross-sectional view of FIG. 21. The orifice 217 is depicted in FIG. 21A as an opening in web 213. Thus, FIGS. 21 and 21A depict an improved A2 rack arm with areas of the web 213 surrounding the orifices thicker than other areas of the web. In some embodiments, the thickness of the web area 213a near orifice 217 may be twice as thick as web 213 itself. In other embodiments, the reinforced areas may be only slighter thicker, with perhaps a 10-25 percent increase in thickness. Other embodiments may have a thickness increase from 25 percent to 75 percent. Yet other embodiments may have a transition area that is more than twice as thick as the web, i.e., an increase of more than 100%. In one example, web 213 has a nominal thickness of 9/32 inch, 0.28125 inches or 7 mm, and areas of the web 213a near orifices 217 are 9/16 inch thick, 0.28125 inches thicker (7 mm), a total thickness of 0.5625 inches (about 14 mm) an increase of 100%. Other increases in thickness, both less than 100% or greater than 100% may be used instead.

Note that in this embodiment, the reinforced area 217a extends from the bottom of the upper surface, e.g., from the bottom of the saddle mounts 211b to the orifice 217. This may also be an advantage in tooling, in that there is at least one less transition for the manufacturer of the A2 arm. As noted above, all transitions in thickness should be gentle, with no sharp corners and generously-radiused transitions. Note that when arm 210 is molded, it is important that internal corners are rounded or radiused, as well as external corners, such as those formed about orifice area 213a. Thus, where the wider web portion 213a meets web 213 having nominal thickness, the internal corner 213b should be radiused. In a similar manner, external corners 213a should also be rounded or radiused.

In testing the improved A2 rack arm, it was found that the improved A2 arm could withstand a maximum load of 2700 pounds placed in the center 218 of the outer saddle mount. Finite element analysis (FEA) showed that this resulted in a point of maximum stress of 30 ksi at an outer point 219 of the inner tie-down orifice. The load, stress and deflection are shown graphically in FIG. 21B. Note by comparison, the prior art arm of FIGS. 20 and 20A could withstand only 1800 pounds of loading. Further testing showed that with an 1800 pound load, the point of maximum stress remained the same, but with a maximum stress of 20 ksi, an improvement (stress reduction) of 1 minus 20 ksi divided by 30 ksi, 0.33, which, multiplied by 100%, equals 33%. Accordingly, an increased interface thickness may be considered a stress attenuator. Alternatively, for a given maximum stress, 30 ksi, the stress attenuator feature may be considered to increase the load-bearing capacity of the arm, in this case from 1800 pounds to 2700 pounds. This is an increase of 50 percent, a significant increase.

Tables 1 and 2 below tabulate the testing conducted on prior art arms and arms manufactured with a stress attenuator, showing the benefit of local reinforcement around openings or orifices in the cable rack arms.

TABLE 1

STRESS REDUCTION WITH STRESS ATTENUATOR (S.A.)

| Arm | Load (lbs.) | FEA max. stress w/o s.a. | FEA max stress with s.a. | Stress reduction with s.a. |
|---|---|---|---|---|
| RA-20 LP + s.a. | 1300 | 24 | 17 | 29 |
| RA-14 LP + s.a. | 1300 | 37 | 24 | 35 |
| A4 + s.a. | 1400 | 46 | 29 | 37 |
| A3 + s.a. | 1600 | 39 | 25 | 36 |
| A2 + s.a. | 1800 | 30 | 20 | 33 |

TABLE 2

INCREASED LOAD-BEARING CAPACITY WITH STRESS ATTENUATOR (S.A.)

| Arm | FEA stress ksi | Max. load w/o s.a., lbs. | Max. load with s.a., lbs. | Bearing load increase with s.a. |
|---|---|---|---|---|
| RA-20 LP + s.a. | 24 | 1300 | 1800 | 38 |
| RA-14 LP + s.a. | 37 | 1300 | 2000 | 54 |
| A4 + s.a. | 46 | 1400 | 2200 | 57 |
| A3 + s.a. | 39 | 1600 | 2500 | 56 |
| A2 + s.a. | 30 | 1800 | 2700 | 50 |

Figure 22:
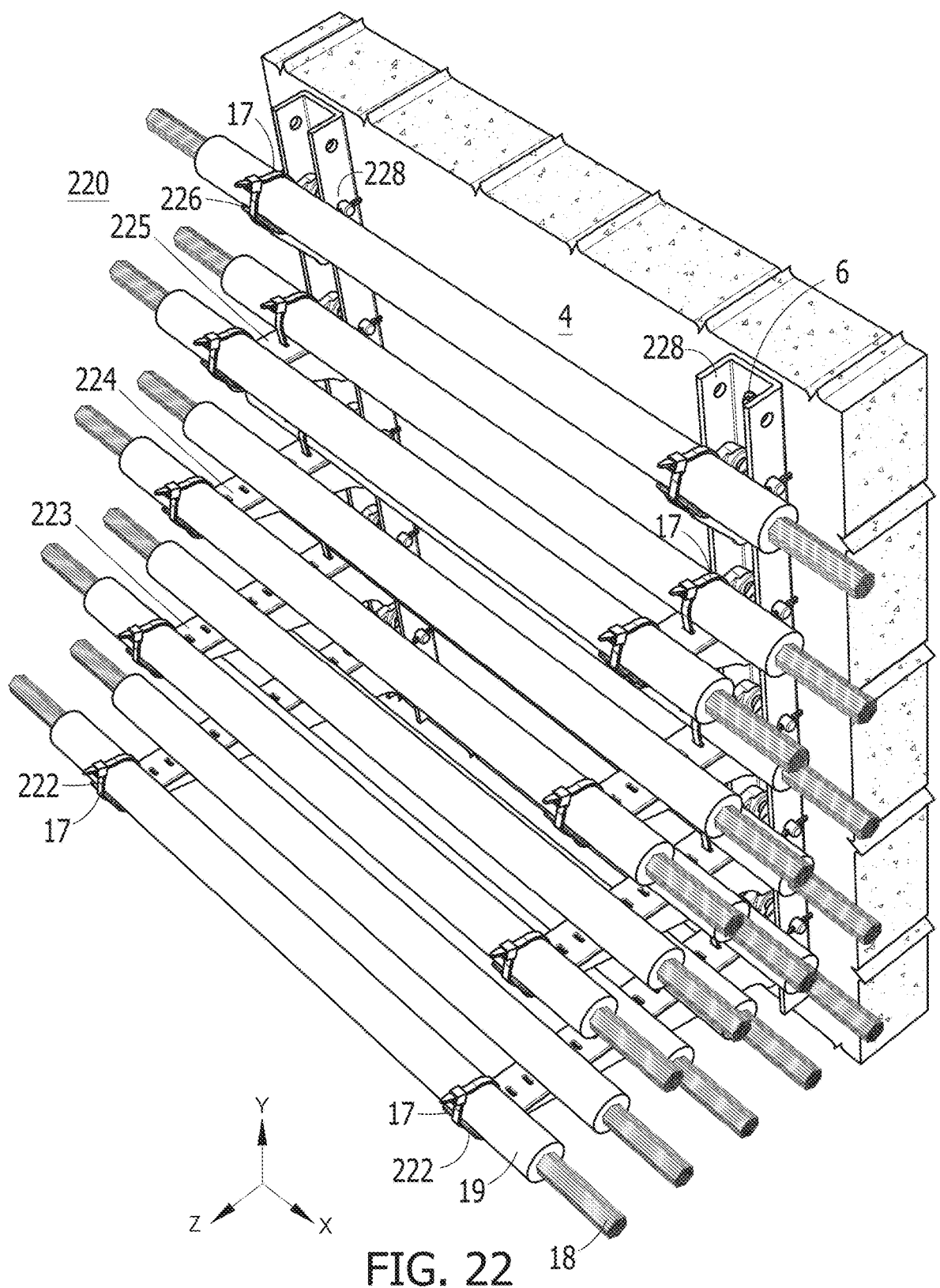
FIG. 22 is a front perspective view of another embodiment of the present disclosure using flat-arm rack arms.

We now continue with the flat arm embodiments. Embodiments of this disclosure are depicted in FIG. 22, which depicts an underground cable installation 220 with two stanchions 228 secured to concrete wall 4 via bolts 6 (only one bolt visible in FIG. 22). The stanchions may be existing metallic stanchions, such as single flange stanchions, double flange steel stanchions, TEE flange stanchions, E-flange stanchions, and the like. Alternatively, the stanchions may be non-metallic, such as non-metallic C-channel stanchion 228. In this instance, each stanchion 228 is used to mount a first lower cable flat arm rack 222, three additional flat arms 223, 224, 225, and final top cable rack arm 226. As can be better seen in FIG. 23, flat arm cable rack arms do not have mounting saddles for power or communication cables, but they do have vertical orifices so cables or conduits can be secured to the rack arms. Cable rack arm 222 in one embodiment is about 26 inches (660 mm) wide and would be able to accommodate four each 6-inches (150 mm) wide conduits or 3 each 8-inches (200 mm) wide conduits, such as a power or communications cables 18 along with a conduit or insulation 19. Many other combinations of cable sizes and quantities may be mounted instead. Other embodiments may include a 21-inch (530 mm) wide flat arm 223, a 16-inch (400 mm) wide flat arm 224, an 11-inch (280 mm) wide flat arm 225, and 6-inch (150 mm) wide flat arm 226. The cables or conduits may be secured to the arms with cable ties 17, discussed above. The portions of the rack arms nearest the stanchion are referred to as the proximal portions, while the portions of the rack arms farthest removed from the stanchion are the distal portions. The proximal portions of the rack arms form an interface for mounting to the stanchion.

A less-encumbered perspective view of the installation is depicted in FIGS. 23-23A, showing pultruded plastic stanchion 228 with the cable rack arms described above with reference to FIG. 22. The stanchion is secured to the concrete wall via one or more bolts 6 using holes or apertures (see FIGS. 25 and 25A) that are molded into the web of the stanchion. Stanchion 228 has a C-shaped cross section, as will also be explained later with respect to FIGS. 25 and 25A. The rack arms are secured to the stanchion with pins or bolts 221, which may be plastic bolts, and cotter pins 221a. The cotter pins are inserted into orifices molded into the flanges of the stanchions.

A rear perspective view of flat rack arm 223 is presented in FIG. 24. FIGS. 24A, 24B and 24C present additional views. Flat arm 223 has a proximal end 223a and a distal end 223b. It has a relatively flat top 223m, an up-turned tip 223n, and a series of through-orifices 223o. Arm 223 also has side walls 223p on either side of the arm, as can be more readily appreciated from FIG. 24A. In one embodiment, the side walls may be about 0.25" (about 6 mm) thick. In other embodiments, the walls may have a variable thickness to allow for a draft angle for a tool when the part is molded. For example, in one embodiment, the side walls may be about 0.25" (6 mm) on the bottom and about 0.30" (8 mm) thick where the side wall meets the top surface. In another embodiment, the side walls may be about 0.281" (7 mm) thick at the bottom and about 0.3125" (8 mm) where the side wall meets the top. The top may be 0.25" (6 mm) thick, or it may be about 0.375" (9-10 mm) thick. In another embodiment, the top may vary in thickness, e.g., thinner at the distal or far end and thicker near the proximal end. For example, in one embodiment, the top may be about 0.375" (9-10 mm) thick at the proximal end and yet have a thickness of about 0.25" (6 mm) at the distal or far end. Other embodiments may have other thicknesses. Proximal end 223a also includes a substantial vertical notch or hollow 223e, allowing arm 223 to be mounted to a variety of other types of stanchions, as discussed above with reference to FIGS. 22 and 23.

Proximal end 223a and the top 223m may be manufactured to form a slightly-obtuse angle C, an obtuse angle being an angle greater than 90°. The obtuse angle of the flat top with the flat portions 223h, 223j on the rear or proximal end 223a prevents downward rotation of arm 223 past the point where the material of the rear surface meets the inner surface of the channel 228. The obtuse angle C in one embodiment is about 91.5 degrees and may range from about 90.5 degrees to about 95 degrees in practice, although other angles may be used, such as a right angle. Having angle C at 91.5° results in the flat arm top 213m having an upward tilt of 1.5°. Other angles may be used so that the flat arm has an upward tilt of from about 1.5° to about 5°. One example is an upward tilt of about 3°. This upward tilt compensates for the deformation of the arm when it is under load by very heavy power and communication cables. In other embodiments, it may be desirable for the rack arm top surface to be at a nominal angle different from horizontal (90°).

Thus, rack arm 223 may be biased to some extent for upward tilting of the rack arm on its distal end, near angle D. The bottom surfaces of the side walls 223p form an acute angle D to the flat portion of top 223m. The angle is less than 90°, and desirably less than 60°. The imaginary apex of the angle formed by the top and the upward-tilting side wall bottom surface will be to the right of arm 223. In practice, angle D may range from about 10 degrees to about 50 degrees, and desirably from about 15 degrees to about 47 degrees. Angle D may be from about 20° to about 30°. Other embodiments may include cable rack arms designed for an orientation of some other angle from horizontal.

Details of the proximal end 223a of arm 223 are shown in FIG. 24C. Proximal end 223a includes a vertical notch or hollow 223e for easier mounting to a variety of stanchions, and horizontal mounting orifices 229a, 229b. Proximal end 223a also includes left and right halves 223c, 223d with flat portions 223f, 223g, respectively. In FIG. 24C, roughly-rhomboid sections 223h and 223j may be molded flat to fit snugly against C-channel, TEE bar, L-angle and E-channel stanchions on which the cable arm is mounted. These are the flat sections discussed above that may be oriented from about 90.5 to 95 degrees to the plane of the top surface of the cable arm. Side reliefs 223k, 2231 allow use of the cable rack arms in existing single flange installations or double flange stanchions having substantial weld formations that would otherwise interfere with their installation, or also with other flanges, e.g., TEE flanges, etc. In the view depicted in FIG. 24C, only the right side wall 223p can be seen. Both side walls are visible in FIG. 24A. The cable rack arm 223 top 223m may be wider nearer proximal end 223a than its distal end 223b.

Flat arm 223 also includes what has been described above as stress attenuators. As shown in FIG. 24B, the material around each orifice 223o has been thickened to act as a stress reliever or stress attenuator. Recognizing that each penetration will act to increase stress, thickening the area around the penetrations will help to relieve the stress and thus act as a stress attenuator. Thus, the area 223r around each orifice 223o has been thickened to act as a stress attenuator. The transition 223s between the bottom surface of arm top 223m and the stress attenuator 223r should not be a sharp corner but should be generously radiused, as described above for other stress attenuator embodiments. Note that for the flat arms, the stress attenuator is all on the under-side of the arm, not on the top surface. The top surface of the flat arms should be kept flat for the convenience of mounting cables and conduits atop the flat arm.

Figure 25:
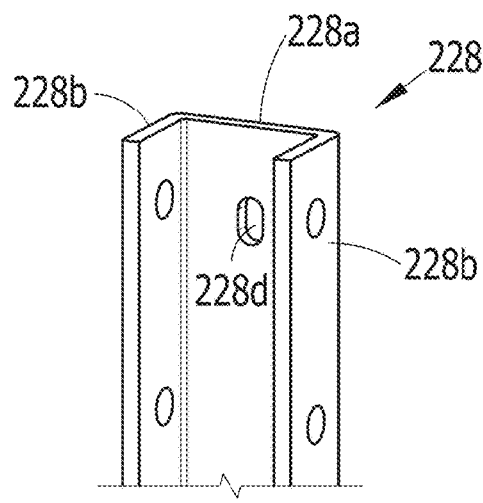
FIGS. 25, 25A and 25B show details of stanchions that may be used with flat rack arms.
Figure 25A:
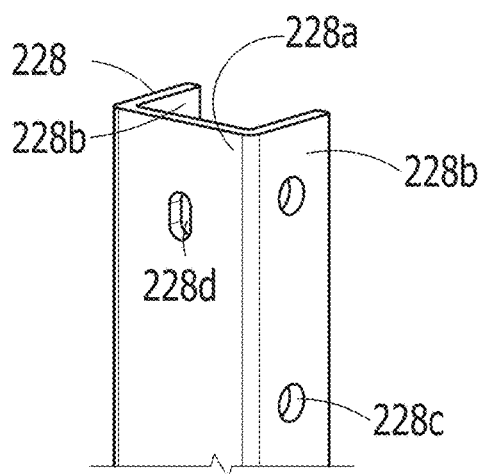
Figure 25B:
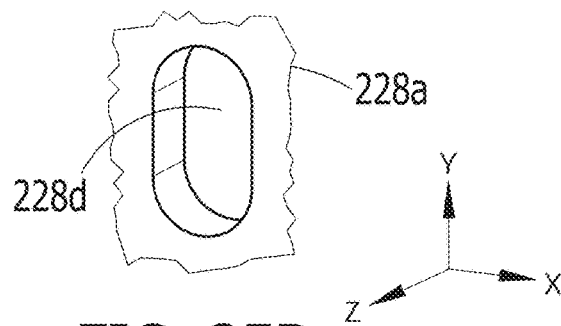

The stanchions that may be used for mounting the flat arms are disclosed in FIGS. 25, 25A and 25B. The FIG. 25 is a front perspective view of stanchion 228, FIG. 25A is a rear perspective view of the stanchion. FIG. 25B is a close-up view of mounting orifice 228d, having an oval shape, for mounting the stanchion to a wall or other mounting surface. The flat rack arms used to support power or communications cable or conduits are mounted to channel stanchion 228 via mounting pins 221, secured with cotter pins 221a (see FIGS. 23, 23A). The proximal or interface portion of the flat rack arms include mounting holes or orifices for mounting pins 221 so the pins can secure the rack arms to stanchion 228. Stanchion 228 has a C-shaped cross section formed by web 228a and flanges 228b on either side of web 228a. The stanchion flanges may also have openings or orifices 228c for mounting cable rack arms. The web 228a may include orifices or openings 228d for mounting to a mounting surface, such as a concrete wall, via bolts as discussed above. Mounting orifice 228d in web 228a may be oval shaped or may have another desired shape.

A side view of the installation is presented in FIGS. 26, 26A and 26B. The installation includes one or more of stanchion 228 mounted to concrete wall with bolts (not seen in FIG. 26). Rack arms 222, 223, 224, 225 and 226 mount to the stanchion with molded pins 221 and are secured with cotter pins 221a. The top surface of each rack arm may hold one or more cables or conduits 18 and insulation 19. Also visible in FIG. 26 is the right side wall 222p, 223p, 224p, 225p, 226p of each arm. Detail side view FIG. 26A depicts shorter flat arm 225 with tip 225n and right side wall 225p, the cables or conduits and associated insulation secured with cable ties 17 and integral fastener 17a. Front perspective view FIG. 26B depicts a flat arm 225 with tip 225n using cable tie 17 to secure communication cables or conduit 18 and insulation 19 to the arm, using orifice 225o. Other cables conduits may also be mounted, e.g., fiber optic cables, etc.

In making and testing improved flat arms, three configurations were used, as depicted in FIGS. 27, 28 and 29 and cross-sectional views 27A, 28A, 29A and 29B. FIG. 27 depicts a flat arm, with no stress attenuators used for the top of the arm, and no ribs supporting the side walls. Flat arm 270 includes a top 271, side walls 272 (only left sidewall shown), back 273 and mounting orifices 274 (only one shown). The flat arm also includes proximal portion 270a, distal portion 270b, a plurality of orifices 275 that penetrate through top 271 and up-turned arm tip 277. In testing, a load 278 is applied on top of the arm, the maximum load in one embodiment may be 1400 lb. The point of the maximum stress 279 that results from this load is found near the center of the arm on the top of the arm. FIG. 27A depicts a cross-sectional view taken from FIG. 27, showing top 271 and both sidewalls 272, along with orifice 275. In side view FIG. 27B, which depicts the FEA resulting stresses, the 1400 lb. load is depicted near the tip of the arm, resulting in a maximum stress in the central portion of the top of the arm, the maximum stress being about 24 ksi. Note also the deflection in the arm after the load is applied. In FIG. 27C, the failure mode is seen to be Euler buckling in the side arms. In this embodiment, the buckling safety factor is found to be 2.2. Cables sometimes move horizontally side-to-side due to thermal expansion, power surges or other moving mechanical forces, putting a horizontal load on the support arms. A safety factor above 1.0 keeps the arm supporting the maximum vertical load. If the safety factor were exactly 1.0, there could be no allowable horizontal movement, and the arm would fail with only slight horizontal movement. This arm has a safety factor (s.f.) of 2.2, that is, the allowable movement is 2.2× maximum load buckling safety.

One improvement in the flat arms is to add stress attenuators to the arm. That is, the thickness of the area under each orifice is increased. FIG. 28 depicts improved flat arm 280, which includes a proximal end 280a, a distal end 280b, top 281 and side walls 282 (only the left sidewall shown). Flat arm 280 also includes a back 283, mounting orifices 284 (only one shown), orifices 285 taken through the top, and upturned tip 287. The area around each orifice 285 on the underside of the top is reinforced with a stress attenuator 286, that is, a thickness increase. In testing, a load 288 is applied on the top of the arm, simulating a load of cables or conduits atop the arm. In one embodiment, the maximum load may be 1400 lb., resulting in a stress of about 21 ksi. The point of maximum stress 289 resulting from this load is again found near the center of the arm, on the top surface of the arm, as shown. FIG. 28A depicts a cross-sectional view taken from FIG. 28, showing top 281 and both sidewalls 282, orifice 285 and stress attenuator 286. Note that the thickness increase due to the stress attenuator is entirely on the underside of top 281, so that the top surface of arm 281 remains flat. In side view FIG. 28B, which depicts the FEA resulting stresses, the 1400 lb. load is depicted near the tip of the arm, resulting in a maximum stress of about 21 ksi in the central portion of the top of the arm. In FIG. 28C, the failure mode is seen to be Euler buckling in the side arms. This arm has a buckling safety factor of 2.2.

In one embodiment, the thickness of the top in the area near each orifice may be doubled. In other embodiments, the reinforced areas may be only slighter thicker, with perhaps a 10-25 percent increase in thickness. Other embodiments may have a thickness increase from 25 percent to 75 percent. Yet other embodiments may have a transition area that is more than twice as thick as the top, i.e., an increase of more than 100%. In one example, top 281 has a nominal thickness of about 0.375 inches (about 10 mm) near the proximal end and a nominal thickness of about 0.25 inches (about 6 mm) near the distal end, i.e., near the tip 277. In another example, top 281 has a nominal thickness of 0.25 inches (about 6 mm), and areas of the web 281 near orifices 285 are 0.5 inches (about 12-13 mm) thick, 0.25 inches (about 6 mm) thicker, an increase of 100%. In other embodiments, the thickness increase may be smaller, from 10-25 percent of the top surface thickness. In yet other embodiments, the thickness increase can be more than 100 percent, e.g., an increase from about 0.25 inches (6 mm) to 0.375" (9-10 mm) or more, e.g., 0.3 inches (7-8 mm) to 0.40 inches (10 mm). Other increases in thickness, both less than 100% or greater than 100% may be used instead. In some embodiments the increased thickness of the stress attenuator may be about 3/16 inch (0.1875 inches or about 5 mm) plus or minus 1/16 inch (0.0625 inches or about 1.5 mm). In the flat arms, the thickness increase generally is found on the underside of the arm, that is, the top itself stays flat and the increased thickness is found on the bottom or underside—see FIGS. 28A, 29A.

Another improvement in the arm is depicted in FIG. 29, namely, one or more ribs that connect the sidewalls, in addition to the stress attenuator discussed above. Arm 290 includes three supporting ribs 292a, 292b, 292c, in addition to a series of stress attenuators 296 on the underside of top 291. Arm 290 includes proximal portion 290a, distal portion 290b, top 291, sidewalls 292 (only left sidewall show in FIG. 29), back 293, mounting holes 294 (only one shown) and tip 297. As noted, arm 290 includes three ribs connecting the sidewalls 292 along with the stress attenuators. FIG. 29A is a cross section of FIG. 29 taken at a stress attenuator 296, showing the increase in thickness of the top 291, on its underside only, and also depicting sidewalls 292, orifice 295 and stress attenuator 296. FIG. 29B is a cross section of FIG. 29 taken at rib 292a. Thus, the cross-sectional view includes top 291, sidewalls 292, and rib 292a connecting the sidewalls. It is preferable to mold the arms with integral ribs as a one-piece molded arm. It is also possible to mold the arms and then add the ribs, e.g., by adhering them between the side walls with an adhesive, or by using fasteners to attach the ribs.

Figure 29D:
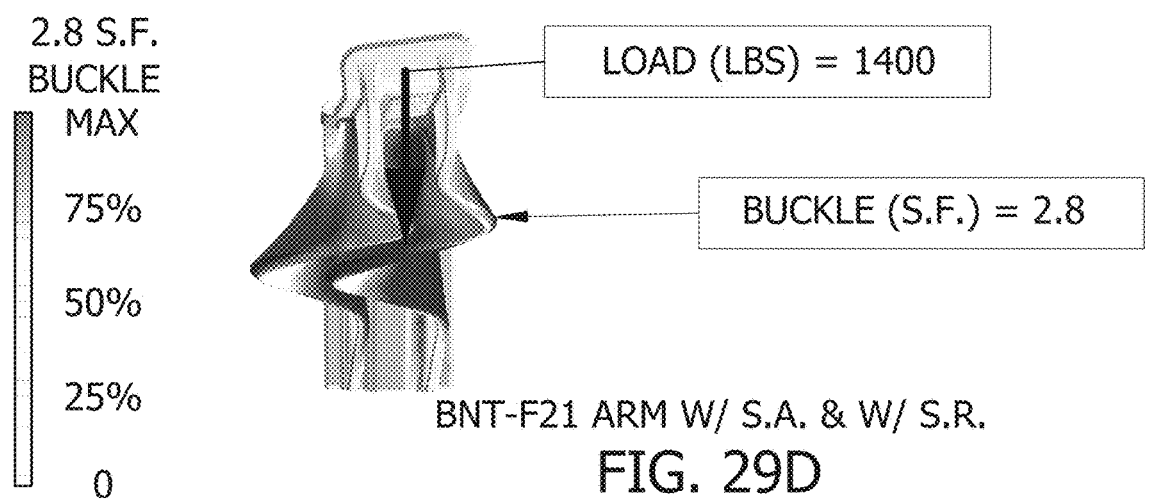

In testing, a load 298 is applied to the top of arm 290 near outer tip 297. As shown in the FEA diagram of FIG. 29C, a load of 1400 lbs. results in a maximum stress of 21 ksi. The point 299 of maximum stress is found near the center of the arm, as shown, on the top surface of the arm. In FIG. 29D, the failure mode is seen to be Euler buckling in the side arms. This arm has a buckling safety factor of 2.8.

The ribs in this embodiment varied in thickness, from about 0.2656 inches (7 mm) just under the bottom surface of the arm to 0.1875 inches (5 mm) thick at the farther end of the ribs. In other embodiments, the ribs may be from about 0.3125" (8 mm) thick just under the arm to about 0.125" (3 mm) thick at the other end. In other embodiments, the ribs may be about 0.25" (6 mm) thick, and the thickness of the rib may vary, typically thicker just under a top surface where reinforcement is needed. The thickness of the rib may then taper off as the rib nears an opposite end (bottom portion) of the side walls. Other thicknesses of ribs may be used.

Because of the configuration of the flat arm rack arms, it is more practical to place the ribs between the orifices on the top of the rack arm. Thus, as shown in FIG. 29, ribs 292a, 292b, 292c are placed between the stress attenuators 296 so as not to interfere with any drainage that may be needed from the top of the arm, and also so as not to interfere with the use of wire ties to secure cables or conduits to the top of the flat rack arm. The ribs also do not interfere with placement of the stress attenuators on the underside of the top surface. The flat arms disclosed herein help to restrain and support heavy loads. The stress attenuators described herein also help to increase the carrying capacity of the arms. The ribs and the stress attenuator help to improve the ability of the flat arm rack arms to support heavy loads, such as the power and communications cables that rest upon the arms. The ribs additionally strengthen and stiffen the arms and, especially with respect to an increase in buckling resistance, by increasing the section modulus of the rack arms.

Table 3, presented here, describes the results of the design and testing of our flat arms cable rack arms. As discussed above, these cable rack arms have stress attenuators and may also have reinforcing rib(s) between the outer skins of the rack arms.

TABLE 3

STRESS REDUCTION AND INCREASED CAPACITY WITH STRESS ATTENUATOR (S.A.)

| Arm | Load (lbs) | FEA stress, ksi | Stress reduction | Load capacity |
| --- | --- | --- | --- | --- |
| 21-inch flat arm | 1400 | 24 | 0 | 1400 lbs |
| With stress attenuator | 1400 | 21 | 13% | 1600 lbs (+14%) |
| With stress attenuator and side ribs | 1400 | 21 | 13% | 1600 lbs (+14%) |

TABLE 4

INCREASED SAFETY FACTOR AND INCREASED BUCKLING STABILITY

| Arm | Load (lbs) | Buckling safety factor | Safety factor increase |
| --- | --- | --- | --- |
| 21-inch flat arm | 1400 | 2.2 | 0% |
| With stress attenuator | 1400 | 2.2 | 0% |
| With stress attenuator and side ribs | 1400 | 2.8 | 27% |

The shapes described in this disclosure are intended to be approximations. As such, they may not be perfect geometrical shapes, such as those described as having a shape of a "circle," a "square," an "oval" or "ovate" shape, other geometric shape, and so forth. When these or other geometric or descriptive terms are used they are approximations of the desired shape rather than adhering to strictly geometrical perfection. There will always be some variation from perfection in the shape of these described and claimed objects. It should be understood that the described or claimed objects, or the tools described herein for use with such objects, have features that are approximations or "generally in the shape of a _____," with the appropriate geometric term inserted in the blank. For example, a surface described as parallel to another surface is understood to be generally parallel rather than perfectly parallel. That is, the two surfaces may have a similar curvature rather than a perfectly symmetrical curvature. Another term of art used is "nominal thickness," in which portions of the new, improved cable rack arm have a nominal thickness greater than the bulk or majority of the web of the arm, the area of greater thickness surrounding the aperture or orifice used for retaining a tie or restraint to tie down one or more cables mounted on the rack arm. The nominal thickness of the web is the general as-molded width or thickness of the web, while the web has an intentionally-molded portion of greater thickness, such as at least 25 or 50 percent thicker, in order to take advantage of the reduced stress or greater load-carrying capacity of the rack arm, as described herein.

In a similar fashion, an object described as "E-shaped," "U-shaped" or "C-shaped," and so forth, is also an approximation and is understood to be "generally E-shaped", rather than a perfect shape of the letter E, "generally U-shaped," rather than a perfect shape of the letter "U," or "generally C-shaped," rather than a perfect shape of a capital C, as the writer intends and the reader interprets a particular term or passage.

All references, including publications, patent applications and patents cited herein are hereby incorporated by reference to the same extent as if each reference were individually and specifically indicated to be incorporated by reference and were set forth in its entirety herein.

The use of the terms "a," "an," and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments are described herein, including the best mode known to the inventors for carrying out the disclosure. Variations of those preferred embodiments may become apparent to those of ordinary skill in the art upon reading the foregoing description. Skilled artisans will use such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A non-metallic cable rack arm, comprising:
a proximal end;
a distal end;
a top formed between the proximal end and the distal end of the cable rack arm, the top including at least one orifice for securing a load atop the non-metallic cable rack arm;
a reinforcement around and under the at least one orifice; and
left and right sidewalls connected to the top and to the proximal and distal ends of the cable rack arm, at least a portion of the left and right sidewalls formed at an angle of less than 60° to the top.

2. A system comprising the non-metallic cable rack arm of claim 1, the system further comprising a stanchion for mounting the cable rack arm.

3. The non-metallic cable rack arm of claim 1, wherein the reinforcement is at least 25 percent thicker than a thickness of the top.

4. The non-metallic cable rack arm of claim 1, wherein the reinforcement is at least 75 percent thicker than a thickness of the top.

5. The nonmetallic cable rack arm of claim 1, further comprising at least one rib between the left and right sidewalls.

6. The non-metallic cable rack arm of claim 5, wherein the at least one rib is mounted closer to the proximal end than to the distal end of the cable rack arm.

7. The non-metallic cable rack arm of claim 5, wherein the at least one rib extends at least halfway down from the top to the left and right sidewalls.

8. The non-metallic cable rack arm of claim 5 wherein the at least one rib is molded as an integral part of the non-metallic cable rack arm.

9. The non-metallic rack arm of claim 5, wherein the at least one rib is effective to increase a buckling stability of the non-metallic rack at least 25%.

10. The non-metallic cable rack arm of claim 1, wherein the proximal end includes at least two orifices one orifice for mounting to a stanchion and a flat surface for mounting against the stanchion.

11. A non-metallic cable rack arm, comprising:
a top portion formed between a proximal end and a distal end of the cable rack arm, the top portion comprising at least one orifice;
a back portion adapted for mounting to a stanchion;
a reinforcement around and under the at least one orifice; and
left and right sidewalls connecting the top portion to the back portion, at least a portion of the left and right sidewalls formed at an angle of less than 60° to the top.

12. The non-metallic cable rack arm of claim 11, further comprising at least one rib between the left and right sidewalls.

13. The non-metallic cable rack arm of claim 12, wherein the at least one rib is mounted closer to the proximal end than to the distal end of the cable rack arm.

14. The non-metallic cable rack arm of claim 12, wherein the at least one rib extends at least halfway down from the top portion to the left and right sidewalls.

15. The non-metallic cable rack arm of claim 11, wherein the back portion includes at least one orifice for mounting to the stanchion and side reliefs below the at least one orifice.

16. The non-metallic cable rack arm of claim 11, wherein the reinforcement is effective to increase a load capacity of the non-metallic cable rack arm at least ten percent or to decrease a stress on the non-metallic cable rack arm at least ten percent for a given load.

17. The non-metallic cable rack arm of claim 11, wherein the reinforcement is at least 25 percent thicker than a thickness of the top portion and further comprising two or three ribs between the left and right sidewalls.

18. The non-metallic cable rack arm of claim 11, wherein the non-metallic cable rack arm has a buckling safety factor of at least 2.2.

19. The non-metallic cable rack arm of claim 11, wherein the reinforcement is selected from the group consisting of: a thickness increase between 25 and 75 percent in the top portion around the at least one orifice; a thickness increase between 75 and 100 percent inclusive around the at least one orifice; and a thickness increase greater than 100 percent around the at least one orifice.

20. The non-metallic cable rack arm of claim 11, further comprising two or more ribs between the left and right sidewalls, the two or more ribs separated from each other by at least one orifice.

* * * * *